US012789162B2

(12) United States Patent
Noble et al.

(10) Patent No.: US 12,789,162 B2
(45) Date of Patent: Nov. 10, 2026

(54) SYSTEM AND METHOD FOR RESISTIVELY HEATED ELEMENT FOR THERMAL REACTOR

(71) Applicant: Circularity Fuels, Inc., Redwood City, CA (US)

(72) Inventors: Fergus Noble, Redwood City, CA (US); Jeremy Swerdlow, Redwood City, CA (US); Ford McClure, Redwood City, CA (US)

(73) Assignee: Circularity Fuels, Inc., Redwood City, CA (US)

( * ) Notice: Subject to any disclaimer, the term of this patent is extended or adjusted under 35 U.S.C. 154(b) by 0 days.

(21) Appl. No.: 19/368,890

(22) Filed: Oct. 24, 2025

(65) Prior Publication Data

US 2026/0166513 A1 Jun. 18, 2026

Related U.S. Application Data

(60) Provisional application No. 63/755,866, filed on Feb. 7, 2025, provisional application No. 63/712,193, filed on Oct. 25, 2024.

(51) Int. Cl.
*B01J 19/00* (2006.01)
*B01J 19/02* (2006.01)
(Continued)

(52) U.S. Cl.
CPC ........... *B01J 19/0013* (2013.01); *B01J 19/02* (2013.01); *B01J 19/24* (2013.01); *H05B 3/22* (2013.01);
(Continued)

(58) Field of Classification Search
None
See application file for complete search history.

(56) References Cited

U.S. PATENT DOCUMENTS 3,694,344 A 9/1972 Munro
3,852,180 A 12/1974 Gregory
(Continued)

FOREIGN PATENT DOCUMENTS

AU 2014200989 A1 10/2014
CA 2691897 A1 8/2010
(Continued)

OTHER PUBLICATIONS

"An expert team, building real-world solutions", Susteon projects, The Wayback Machine—https://web.archive.org/web/20230703052621/https://susteon.com/projects/, first downloaded Dec. 12, 2024.
(Continued)

*Primary Examiner* — John J Figueroa
(74) *Attorney, Agent, or Firm* — Jeffrey Schox; Randy Mehlenbacher

(57) ABSTRACT

A resistively heated element can include a base, an insulating material, optional spacers, active coatings, and optional electrodes. A resistively heated element can be formed by preparing an insulating coating solution, depositing the insulating coating on a base, and curing the insulating coating. Additionally or alternatively, an insulating material can be connected to the base. A method of operation can include heating the thermal reactor and introducing the reactants to the thermal reactor.

13 Claims, 8 Drawing Sheets

(51) Int. Cl.
*B01J 19/24* (2006.01)
*H05B 3/22* (2006.01)

(52) U.S. Cl.
CPC ................. *B01J 2219/00135* (2013.01); *B01J 2219/0209* (2013.01); *B01J 2219/024* (2013.01)

(56) References Cited

U.S. PATENT DOCUMENTS

| | | | |
|---|---|---|---|
| 4,919,974 A | 4/1990 | Mccune et al. | |
| 5,100,635 A | 3/1992 | Krishnamurthy et al. | |
| 5,174,796 A | 12/1992 | Davis et al. | |
| 6,444,012 B1 | 9/2002 | Dolan et al. | |
| 6,534,552 B2 | 3/2003 | Benham et al. | |
| 6,696,501 B2 | 2/2004 | Schanke et al. | |
| 8,720,637 B2 | 5/2014 | Wieres et al. | |
| 9,034,208 B1 | 5/2015 | Agee | |
| 9,293,680 B2 * | 3/2016 | Poliquin | H01M 14/00 |
| 9,352,269 B2 | 5/2016 | Tammera et al. | |
| 9,452,402 B2 | 9/2016 | Tonkovich et al. | |
| 9,542,402 B2 * | 1/2017 | Chang | G06F 16/13 |
| 9,994,970 B2 | 6/2018 | Vince | |
| 10,448,713 B1 | 10/2019 | Gavin | |
| 11,179,668 B2 | 11/2021 | Wang et al. | |
| 11,225,618 B1 | 1/2022 | Gupta et al. | |
| 11,326,110 B2 | 5/2022 | Roy et al. | |
| 11,371,162 B2 | 6/2022 | Shearman et al. | |
| 11,572,512 B2 | 2/2023 | Greager et al. | |
| 11,578,281 B2 | 2/2023 | Greager et al. | |
| 11,585,012 B2 | 2/2023 | Shearman et al. | |
| 11,591,215 B2 | 2/2023 | Mortensen et al. | |
| 11,618,860 B2 | 4/2023 | Greager et al. | |
| 11,713,250 B2 | 8/2023 | Shearman et al. | |
| 11,840,668 B2 | 12/2023 | Greager et al. | |
| 11,905,173 B2 | 2/2024 | Mortensen et al. | |
| 12,098,328 B2 | 9/2024 | Darcy et al. | |
| 12,214,327 B2 | 2/2025 | Mortensen et al. | |
| 12,330,942 B2 | 6/2025 | Mortensen et al. | |
| 12,344,525 B2 | 7/2025 | Mortensen et al. | |
| 2002/0070127 A1 | 6/2002 | Song et al. | |
| 2006/0124445 A1 | 6/2006 | Labrecque et al. | |
| 2010/0326135 A1 | 12/2010 | Twitchen et al. | |
| 2012/0302045 A1 | 11/2012 | Yamada et al. | |
| 2013/0109074 A1 | 5/2013 | Aines et al. | |
| 2014/0322632 A1 | 10/2014 | Sugimoto et al. | |
| 2014/0346401 A1 | 11/2014 | Johnston | |
| 2015/0267131 A1 | 9/2015 | Iaccino et al. | |
| 2016/0230311 A1 | 8/2016 | Vince | |
| 2017/0183228 A1 | 6/2017 | Lin et al. | |
| 2018/0266759 A1 | 9/2018 | Van Roosmalen | |
| 2018/0351069 A1 | 12/2018 | Boukai et al. | |
| 2021/0095373 A1 | 4/2021 | Ballantine et al. | |
| 2021/0348301 A1 | 11/2021 | Shearman et al. | |
| 2022/0017830 A1 | 1/2022 | Gupta et al. | |
| 2022/0135894 A1 | 5/2022 | Gupta et al. | |
| 2022/0177796 A1 | 6/2022 | Greager et al. | |
| 2022/0306559 A1 | 9/2022 | Mortensen et al. | |
| 2022/0402764 A1 | 12/2022 | Zhou et al. | |
| 2023/0167367 A1 * | 6/2023 | McClure | B01J 19/0066 201/2.5 |
| 2023/0356177 A1 | 11/2023 | De Sarkar et al. | |
| 2024/0115987 A1 | 4/2024 | Jeong-potter et al. | |
| 2025/0074842 A1 | 3/2025 | Beaton et al. | |
| 2025/0276299 A1 * | 9/2025 | Zugic | B01J 12/007 |

FOREIGN PATENT DOCUMENTS

| | | | |
|---|---|---|---|
| GB | 2247413 | A | 3/1992 |
| JP | 2005060137 | A | 3/2005 |
| JP | 6035553 | B2 | 11/2016 |
| TW | 201413045 | A | 4/2014 |
| WO | 8910471 | A1 | 11/1989 |
| WO | 2009025003 | A2 | 2/2009 |
| WO | 2013003948 | A1 | 1/2013 |
| WO | 2013135660 | A1 | 9/2013 |
| WO | 2014154250 | A1 | 10/2014 |
| WO | 2016007825 | A1 | 1/2016 |
| WO | 2019110268 | A1 | 6/2019 |
| WO | 2020174056 | A1 | 9/2020 |
| WO | 2021097363 | A1 | 5/2021 |
| WO | 2021226410 | A1 | 11/2021 |
| WO | 2022256361 | A2 | 12/2022 |

OTHER PUBLICATIONS

"Dual Function Materials for Direct Air Capture of CO2", Office of Science (OS), Grant No. DESC0020795, Jul. 2020.

"Energized by Innovation", Susteon Team, The Wayback Machine—https://web.archive.org/web/20230703052959/https://susteon.com/our-team/, first downloaded Dec. 12, 2024.

"From thinking it to making it", Susteon, What We Do, The Wayback Machine—https://web.archive.org/web/20230927221250/https://susteon.com/what-we-do/, first downloaded Dec. 12, 2024.

"Metallic VS Ceramic Catalytic Converters", NiWire Industries Co., Ltd., ttps://www.niwire.com/metallic-vs-ceramic-catalytic-converters/, Jun. 5, 2019.

"Pressure swing adsorption", Wikipedia, first downloaded Dec. 12, 2024.

"SBIR Phase I: Sorbent-Enhanced Catalysis for Robust, High-Conversion Single Pass Hydrogenation for Renewable Natural Gas Production", Granting Office 491503 Translational Impacts, Grant No. 2432928, Sep. 15, 2024.

"Sustaera Closes $10 million Series A Financing to Develop Low-Cost Direct Air Capture Technology", Businesswire, https://www.businesswire.com/news/home/20211216005309/en/Sustaera-Closes-10-million-Series-A-Financing-to-Develop-Low-Cost-Direct-Air-Capture-Technology, Dec. 16, 2021.

Adhikari, et al., "Hydrogen Membrane Separation Techniques", Ind. Eng. Chem. Res. 2006, 45, 875-881.

Arellano-Treviño, et al., "A catalyst and adsorbent combination for in-situ conversion of CO2 to synthetic natural gas", Earth and Environmental Engineering, Columbia University in the City of New York, 500W 120th Street, 10027, New York, NY, United States, first downloaded Dec. 12, 2024.

Arellano-Treviño, et al., "Catalysts and adsorbents for CO2 capture and conversion with dual function T materials: Limitations of Ni-containing DFMs for flue gas applications", Journal of CO2 Utilization 31 (2019) 143-151.

Arroyo-Caire, et al., "A Conceptual Approach for the Design of New Catalysts for Ammonia Synthesis: A Metal- Support Interactions Review", Nanomaterials 2023, 13, 2914, p. 1-21 (Year 2023).

Beaton, et al., "System and Method for Atmospheric Pressure Methane Enrichment", U.S. Appl. No. 19/194,670, filed Apr. 30, 2025.

Bermejo-López, et al., "Mechanism of the CO2 storage and in situ hydrogenation to CH4. Temperature and adsorbent loading effects over Ru—CaO/Al2O3 and Ru—Na2CO3/Al2O3 catalysts", Applied Catalysis B: Environmental 256 (2019) 117845.

Cao, et al., "CO2 conversion to syngas via electrification of endothermal reactors: process design and environmental impact analysis", Energy Conversion and Management, vol. 265, Aug. 1, 2022, 115763.

Choi, et al., "Pre-reforming of higher hydrocarbons contained associated gas using a pressurized reactor with a Nh95-Ru0_05/CGO catalyst", Chemical Engineering Science, 2017, 168, 15-22 (Year 2017).

Devi, et al., "A con1prehensive review of the pyrolysis process: from carbon nanomaterial synthesis to waste treatn1ent", Oxford Open Materials Science, 2021, 1, p. 1-30 (Year 2021).

Duyar, et al., "CO2 utilization with a novel dual function material (DFM) for capture and catalytic conversion to synthetic natural gas: An update", Journal of CO2 Utilization, accepted May 11, 2026.

Duyar, et al., "Dual function materials for CO2 capture and conversion using renewable H2", Applied Catalysis B: Environmental 168 (2015) 370-376.

(56) References Cited

OTHER PUBLICATIONS

Gao, et al., "Syngas Production from Biomass Gasification: Influences of Feedstock Properties, Reactor Type, and Reaction Parameters", ACS Omega 2023, 8, 31620-31631.
Jatkar, Arund. , "A New Catalyst Support Structure for Automotive Catalytic Converters", SAE Technical Paper 971032, 1997, https://doi.org/10.4271/971032.
Jeong-Potter, et al., "Dual function materials (Ru+Na2O/Al2O3) for direct air capture of CO2 and in situ catalytic methanation: the impact of realistic ambient conditions", Science Direct, published 2021.
Jeong-Potter, et al., "Feasibility Study of Combining Direct Air Capture of CO2 and Methanation at Isothermal Conditions with Dual Function Materials", Applied Catalysis B: Environmental, available online Aug. 11, 2020.
Kokka, et al., "Hydrogen production via steam reforming of propane over supported metal catalysts", International Journal Hydrogen Energy 2020, 45, 14849 - 14866 (Year 2020).
Lin, et al., "Electrified thermochemical reaction systems with high-frequency metamaterial reactors", Joule 8, 2938-2949, Oct. 16, 2024.
Lindig, Ryan, "Protecting the Intellectual Property Aspects of Synthetic Diamonds: Part 1", The Advocate, Jan. 2022.
Lindig, Ryan, "Protecting the Intellectual Property Aspects of Synthetic Diamonds: Part 2", The Advocate, Sep. 2022.
Majewski, W. Addy, "Metallic Catalyst Substrates", DieselNet Technology Guide, Emission Control Catalysts, date unknown, first downloaded Aug. 20, 2025.
Maus, et al., "The Conical Catalytic Converter and Its Potential for Future Close-Coupled Converter Concepts", SAE Technical Paper 980414, 1998.
Merkouri, et al., "Closing the Carbon Cycle with Dual Function Materials", Energy & Fuels, vol. 35, No. 24, Dec. 2, 2021 (Dec. 2, 2021), pp. 19859-19880, XP093220482, Washington, DC, US. ISSN: 0887-0624, DOI: 10.1021 /acs.energyfuels.1 c02729.
Mistler, Richard E. , "Tape Casting, Theory and Practice", The American Ceramic Society, ISBN: 1-57498-029-7, 2000.
Ning, et al., "Recent Progress in the Integration of CO2 Capture and Utilization", vol. 28, No. 11, Jun. 1, 2023 p. 4500, XP09326411, CH, ISSN: 1420-3049, DOI: 10.3390/molecules28114500. https://doi.org/10.3390/molecules28114500, Retrieved from the internet: URL: http://www.mdpi.com/1420-3049/28/11/4500/pdf>, section 2.4; p. 9-p. 10.
Pedersen, et al., "Green CVD—Toward a sustainable philosophy for thin film deposition by chemical vapor deposition", J. Vac. Sci. 2021, 39, 051001, p. 1-10 (Year 2021).
Piotrowski, Gregory K. , "A Resistively Heated Catalytic Converter With Air Injection For Oxidation Of Carbon Monoxide And Hydrocarbons At Reduced Ambient Temperatures", Technical Report EPA/AA/CTAB/89-06, Sep. 1989.
Piotrowski, Gregory K. , "Evaluation Of A Resistively Heated Metal Monolith Catalytic Converter On A Gasoline-Fueled Vehicle", Technical Report EPA/AA/CTAB/88-12, Dec. 1988.
Proaño, et al., "In-situ DRIFTS study of two-step CO2 capture and catalytic methanation over T Ru,"Na2O"/Al2O3 Dual Functional Material", Applied Surface Science 479 (2019) 25-30.
Roychoudhury, et al., "Development and Performance of MicrolithTM Light-Off Preconverters for LEV/ULEV", SAE Technical Paper 971023, 1997, https://doi.org/10.4271/971023.
Turan, Emre, "Electrified heating of endothermal reactions in a catalytic fixed-bed reactor", Technische Universitat Berlin, Doctoral Thesis, doi.org/10.14279/depositonce-23320, Feb. 19, 2025.
Welfley, et al., "Protecting the Intellectual Property Aspects of Synthetic Diamonds: Part 1", idaho.gov, https://isb.idaho.gov/blog, published Jun. 24, 2022.
Zheng, et al., "Joule-Heated Catalytic Reactors toward Decarbonization and Process Intensification: A Review", ACS Engineering, Aug. 2024, 4, 4-21 (Year 2023).
Fryda, et al., "A new method of diamond CVD with a closed gas circuit", Diam. Relat. Mater. 1994, 3, 1040-1044 (Year: 1994).
Rosen, "Reactor Design", (Year: 2014).
Aasberg-Petersen, et al., "Synthesis gas production for FT synthesis", Studies in Surface Science and Catalysis 152, A. Steynberg and M. Dry (Editors), Chapter 4, Elsevier B.V., 2004, pp. 258-405.
Hernandez, et al., "Optimization for biogas to chemicals via tri-reforming. Analysis of Fischer-Tropsch fuels from biogas", Energy Conversion and Management, vol. 174, 2018, pp. 998-1013.
Herz, et al., "Design and evaluation of a Fischer-Tropsch process for the production of waxes from biogas", Energy, Accepted Manuscript, DOI 10.1016/j.energy.2017.05.102, accepted May 15, 2017 (Year: 2017).
Hillestad, et al., "Improving carbon efficiency and profitability of the biomass to liquid process with hydrogen from renewable power", Fuel, vol. 234, 2018, pp. 1431-1451.
Labrecque, et al., "Dry reforming of methane with CO2 on an electron-activated iron catalytic bed", Bioresource Technology, vol. 102, Sep. 25, 2011 (available online), pp. 11244-11248.
Milne, et al., "Hydrogen from Biomass: State of the Art and Research Challenges", National Renewable Energy Laboratory, Report IEA/H2/TR-02/001, A Report for the International Energy Agency Agreement on the Production and Utilization of Hydrogen, Task 16, Hydrogen from Carbon-Containing Materials, 2002.
Okeke, et al., "Techno-economic assessment of biogas to liquid fuels conversion technology via Fischer-Tropsch synthesis", Biofuels, Bioproducts and Biorefining (Biofuels, Bioprod. Bioref), DOI 10.1002/bbb.1758, 2017.
PÉRez-Camacho, et al., "Biogas reforming using renewable wind energy and induction heating", Catalysis Today, DOI 10.1016/j.cattod.2014.06.010, accepted Jun. 3, 2014 (Year: 2014).
Rieks, et al., "Experimental study of methane dry reforming in an electrically heated reactor", International Journal of Hydrogen Energy, DOI 10.1016/j.ijhydene.2015.09.113, 2015, pp. 1-12.
Spagnolo, et al., "Direct Electro-Steam Reforming: A Novel Catalytic Approach", International Journal of Hydrogen Energy, vol. 17, No. 11, 1992, pp. 839-846.
Wismann, et al., "Electrified methane reforming: A compact approach to greener industrial hydrogen production", Science, vol. 364, May 24, 2019, pp. 756-759.

* cited by examiner

SYSTEM AND METHOD FOR RESISTIVELY HEATED ELEMENT FOR THERMAL REACTOR

CROSS-REFERENCE TO RELATED APPLICATIONS

This application claims the benefit of U.S. Provisional Application No. 63/755,866 filed 7 Feb. 2025, and U.S. Provisional Application No. 63/712,193 filed 25 Oct. 2024, which are each incorporated in its entirety by this reference.

STATEMENT OF GOVERNMENT SUPPORT

This invention was made with government support under Award Number 2432928 awarded by the U.S. National Science Foundation. The government has certain rights in the invention.

TECHNICAL FIELD

This invention relates generally to the resistive heating field, and more specifically to a new and useful system and method in the resistive heating field (e.g., for chemical processes involving active coatings for the transformation of materials).

DETAILED DESCRIPTION

The following description of the embodiments of the invention is not intended to limit the invention to these embodiments, but rather to enable any person skilled in the art to make and use this invention.

1. Overview

Figure 1:
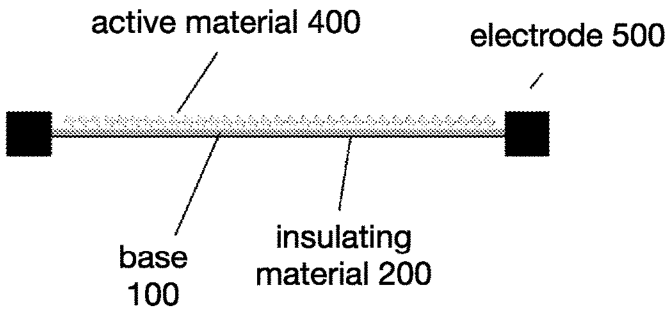
FIG. 1 is a schematic representation of an example of a resistively heated element.
Figure 2A:
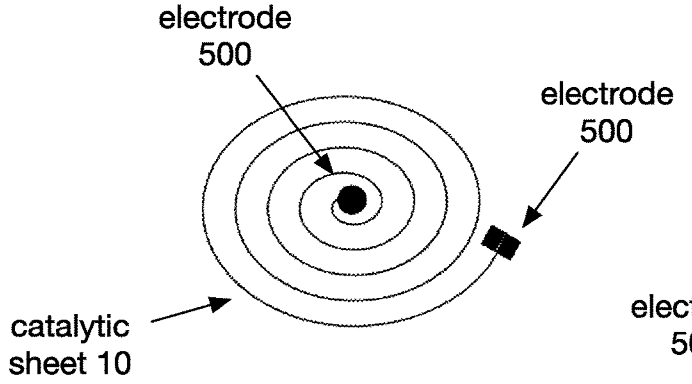
FIGS. 2A-2D are schematic representations of cross-sectional views of exemplary conductive material pathways through a resistively heated element including exemplary electrode arrangements or connections.
Figure 2B:
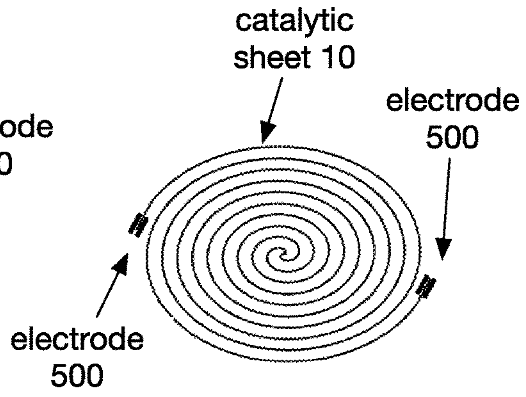
Figure 2C:
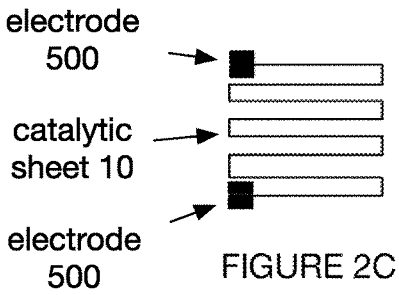
Figure 2D:
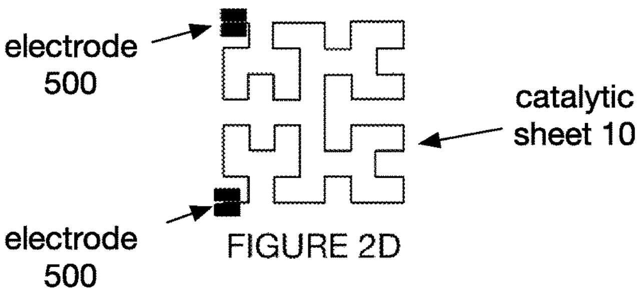

As shown in FIG. 1, a resistively heated element can include a base 100 (e.g., an electrically conductive base), an insulating material 200 (e.g., deposited on the base, in contact with a base, etc.), optional spacers 300, active coatings 400 (e.g., a catalyst, sorbent, support material, etc.), and optional electrodes 500.

Figure 10:
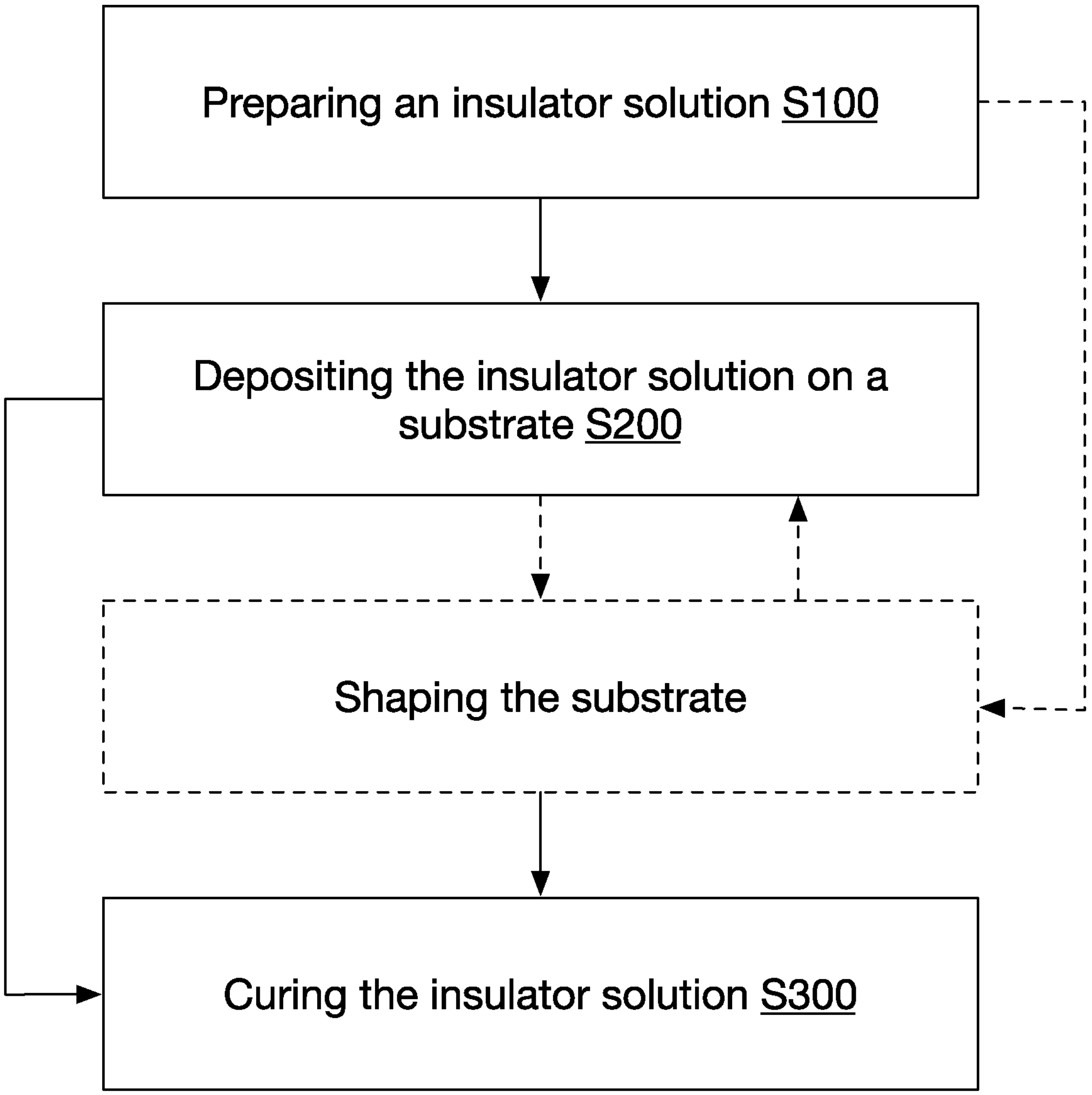
FIG. 10 is a schematic representation of an example of forming a resistively heated element.

As shown in FIG. 10, a resistively heated element can be formed by preparing an insulating coating solution (e.g., a slurry, slip, suspension, dispersion, etc.), depositing the insulating coating on a base, and curing the insulating coating (e.g., while maintaining a target structure of the base or resistively heated element). Additionally or alternatively, an insulating material can be connected to (e.g., adhered to, attached to, bonded to, rigidly connected with an offset from, forming a separate layer that does not directly form chemical bonds with, etc.) the base (and/or other suitable substrate).

Figure 11:
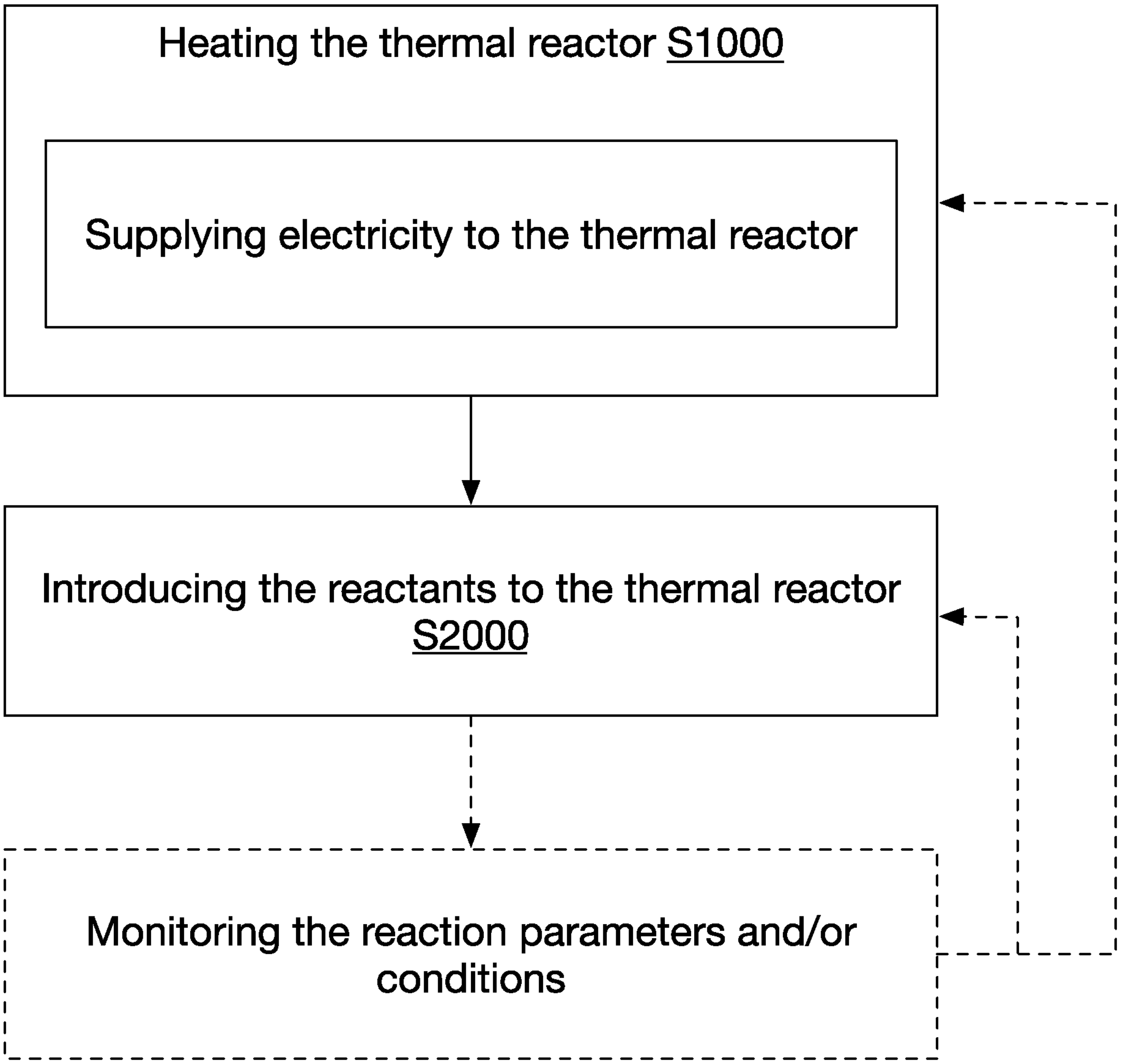
FIG. 11 is a schematic representation of an example of operating a thermal reactor.

As shown in FIG. 11, a method of operation can include heating the thermal reactor S1000 and introducing the reactants to the thermal reactor S2000. In variants, the method can include monitoring the reaction parameters and/or conditions and/or other suitable steps (e.g., preprocessing reactants, post-processing products, etc.).

Variations of the technology with active materials can be used for dual-functional material applications (e.g., catalysis and sorption), single-functional material functions (e.g., one of catalysis or sorption), and/or for other poly-functional material applications. Exemplary applications of the technology include: reverse-water gas shift reaction, hydrocarbon reforming (e.g., steam methane reforming, dry methane reforming, etc.), methanation of oxygenated carbon, ethylene steam cracking, nonoxidative coupling of methane, temperature swing adsorption processes, direct air capture (and desorption), surface flow reactions, and/or other suitable processes (particularly using gas phase reactants and ideally gas phase products, endothermic reactions such as ammonia cracking process). Depending on the process (and materials), variants of the resistively heated element with active materials can achieve operating temperatures between about 50° C. and 2000° C.

2. Examples

In an illustrative example, a resistively heated reaction module can include: a rolled conductive material connected to a first electrode and a second electrode where electricity is passed between the first electrode and the second electrode along substantially the entire length of the rolled conductive material, where the conductive material (and materials in contact therewith) is resistively heated by the electricity, where the conductive material includes an insulating material (e.g., an insulating coating) to hinder electrical shorting pathways between regions of the rolled conductive material, and bases to maintain substantially constant spacing for fluid to flow through the rolled conductive material. In variations of this specific example, the conductive material can be an iron-chromium-aluminium (FeCrAl) alloy, preferably including at least 4% by mass aluminium. In variations of this specific example, the insulating material can be a ceramic such as alumina, zirconia toughened alumina, yttria stabilized zirconia, mica, and/or other suitable insulating material (e.g., with a coefficient of thermal expansion matched to the coefficient of thermal expansion of the conductive material either directly or with an intervening layer selected to grade the values of CTE to minimize thermal stresses and/or coating delamination, with sufficient dielectric strength, etc.).

In an illustrative example, a resistively heated reaction module can be formed by tape casting an insulating material on an electrically conductive substrate (e.g., conductive foil, conductive mesh, etc.), forming (e.g., rolling, shaping, etc.) the electrically conductive substrate (e.g., while the insulating material is still in a green body state), and curing the insulating material (e.g., thermal curing, firing, sintering, laser bonding, etc.).

3. Technical Advantages

Variants of the technology can confer one or more advantages over conventional technologies.

First, variants of the technology can heat a thermal reaction module (e.g., with active coatings) leveraging green energy. For instance, using resistive heating, electricity from renewable sources such as solar power, wind power, hydrogen, hydropower, bioenergy, geothermal energy, and/or nuclear energy, can be leveraged to heat the thermal reaction module thereby decreasing a carbon footprint compared to traditional thermal reactors (e.g., heated using coal or other non-renewable energy sources). Relatedly, variants of the technology can result in improved uniformity of temperature throughout the thermal reaction module (e.g., by minimizing the distance from the heat source to the active material, by having a uniform current density, by mitigating short-circuit pathways, temperature gradients associated with convective heat transfer, etc.).

Second, variants of the technology can tailor a power used to heat the thermal reaction module for a given electrical current (e.g., while maintaining an electrical current below a threshold electrical current).

Third, variants of the technology may be suitable for high fluid flux applications (e.g., applications where there is high material flux through the thermal reactor module). In some examples, the design can enable rapid cycling of temperature to facilitate chemical reactions with material desorption. As another example, the reaction module can operate in a substantially steady-state operation (e.g., with fluctuations less than about 5% over tens of hours of operation) to generate a surface heat flux (e.g., at the active material) between about 0.01 and 100 W/cm$^2$. As a specific example, providing high surface heat fluxes (e.g., exceeding about 0.2 W/cm$^2$, 0.5 W/cm$^2$, 1 W/cm$^2$, 10 W/cm$^2$, 500 W/cm$^2$, etc.) can be advantageous for driving highly endothermic reactions (e.g., steam methane reforming using a Rh-based catalyst or other reactions that are kinetically limited based on the amount of heat that can be provided by the reactor).

Fourth, the inventors have discovered that leveraging fully ceramic materials can result in irreversible or poorly reversible entrapment of fluid within the thermal reaction module. To overcome this issue, variants of the technology can utilize an electrically conductive base that is coated with an electrical insulator (e.g., ceramic). However, some variants of the technology could function using only ceramic materials (e.g., an electrically conductive ceramic).

Fifth, variants of the technology can reduce the thermal mass of the reactor to be heated, for example, by combining the heating source directly with the active surface of the reactor.

However, further advantages can be provided by the system and method disclosed herein.

4. Resistively Heated Element

As shown in FIG. 1, a resistively heated element (e.g., thermal reaction module) can include a base 100 (e.g., an electrically conductive base 100, conductor 100, conductive layer, conductive plate, conductive foil, conductive stratum, structured conductive plate, etc.), an insulating (e.g., dielectric) material 200 (e.g., deposited or layered on, attached to, etc. the base), optional spacers 300, active materials 400 (e.g., catalyst, sorbent, co-catalyst, promoter, inhibitor, support, etc.), and electrodes 500. The resistively heated element preferably functions to facilitate one or more chemical reactions and/or physical processes that can preferentially occur at elevated temperatures (e.g., elevated relative to room temperature, to an external temperature of an environment proximal to the resistively heated element, etc.). For instance, the resistively heated element can be heated to a temperature between about 200° C. and 3000° C. (e.g., 250° C., 300° C., 400° C., 500° C., 750° C., 1000° C., 1250° C., 1500° C., 2000° C., 2500° C., etc. depending on the application). The materials as used in the thermal reaction module are preferably durable to above the target reaction temperatures and/or curing temperatures. For instance (even in variants of the technology that operate at temperatures below 1000° C.), the materials can be durable to at least 1100° C. to retain stability of the materials under thermal processing during formation of the thermal reaction module.

The base 100 (e.g. conductive base, conductor, etc.) can function as a surface for deposition of one or more materials (e.g., active materials, catalyst, sorbent, support material, etc.), can function as an electrical conductor (e.g., conduct electricity between electrodes while increasing in temperature because of the transported electricity also referred to as Joule heating), and/or can otherwise function. The base is preferably electrically conductive or semiconducting. The base can be a foil, a mesh, a woven material (e.g., made of fibers), can have a structured design (e.g., engineered perforations, through-holes, etc.), and/or can have other suitable design. As a specific example, the base can have a length between 1 ft and 5000 ft (e.g., 2 ft, 4 ft, 6 t, 8 ft, 10 ft, 20 ft, 40 ft, 50 ft, 30 m, 75 ft, 100 ft, 40 m, 150 ft, 50 m, 60 m, 200 ft, 250 ft, 300 ft, 100 m, 400 ft, 500 ft, 600 ft, 700 ft, 800 ft, 900 ft, 1000 ft, 2000 ft, 3000 ft, 4000 ft, 5000 ft, etc.), a width between about 1 in and 30 in (e.g., 1 in, 2 in, 3 in, 4 in, 5 in, 6 in, 8 in, 7 in, 8 in, 10 in, 12 in, 18 in, 20 in, 24 in, 28 in, etc.) and a thickness between about 10 μm and 200 μm (e.g., 20 μm, 40 μm, 50 μm, 75 μm, 100 μm, 150 μm, 175 μm, 190 μm, etc.). However, the base can have other suitable geometries (e.g., depending on the electrical properties, material, gas flux, etc.).

Exemplary base materials include: Kanthal (e.g., iron-chromium-aluminium alloys), Nichrome (e.g., nickel-chromium alloys), Chromel, Constantan (e.g., copper-nickel alloy), steel, stainless steel, aluminium alloy, Manganin, Hastelloy, Inconel, Waspaloy, Rene alloys, MP98T, TMS alloys, CMSX, Incoloy, Monel, Brightray, Nimonic, Stellite, and/or other suitable alloys (e.g., alloys including copper, iron, nickel, chromium, titanium, vanadium, chromium, manganese, cobalt, aluminium, zirconium, yttrium, or other suitable transition metals). Additionally or alternatively, base materials can include metals (e.g., substantially pure transition metals) and/or other suitable materials. In some illustrative examples, Kanthal with an aluminium content exceeding 4% (or other alloys that include aluminium) can provide a technical advantage as the material can form an alumina surface layer (which can be beneficial for improving adhesion of the insulating coating, can act as an insulating coating, etc.). In variations of this illustrative example, other alloys that can form oxide surface layers (such as titania, zirconia, etc.) can provide similar technical advantages.

In some variations, the base material can be joined together at one or more position (e.g., a center or middle of the resistively heated thermal module, an edge of the resistively heated thermal module, etc.), which can provide a technical advantage of mitigating a risk of telescoping of the resistively heated thermal element. The base can be joined, for instance, using brazing (e.g., using a brazing paste, brazing foil, etc.), welding (e.g., ultrasonic welding, laser welding, resistance welding, etc.), soldering, crimping, riveting, and/or other suitable attachment mechanisms. However, in some variants, a joining mechanism may not be necessary (e.g., when the insulating material provides sufficient force to retain a structure of the resistively heated module).

In some variants, the base material can be patterned. The patterning can provide a technical advantage of improving adhesion (e.g., of the insulating coating, of the catalyst, etc.), reducing stress related failure from differential thermal expansion (e.g., differences in temperature, differences in coefficient of thermal expansion, differences in heat transport, etc.), increased surface area, promotion of controlled cracking, improved fluid mixing, and/or can provide other technical advantages. For instance, the base material can be textured (e.g., using abrasives, media blasting, knurling, texturing, etc.), perforated (e.g., with holes, slots, slits, etc. to provide regions for base material expansion), shaped (e.g., corrugated, undulated, etc.), chemically etched, and/or can otherwise be patterned.

The insulating material 200 (e.g., insulating coating, insulator, dielectric material, dielectric coating, etc.) functions to electrically isolate the base material to promote electricity to pass along the full length of the base material (e.g., prevent short circuits). The insulating material can additionally or alternatively function to improve a mechanical resilience of the thermal reaction module, modify flow properties of a fluid through the thermal reaction module, and/or can otherwise function.

The insulating material can be a coating (e.g., deposited on, grown on, chemically bonded to, etc. the base material), can be a separate layer from the base (e.g., adhered to, connected to, offset from, etc. the base), and/or can otherwise be arranged. As an illustrative example, a ceramic paper (or other flexible ceramic, ceramic fiber, ceramic sheet, etc.) can be coupled to (e.g., contacted with, adhered to, etc.) a base.

The insulating material preferably has a dielectric strength exceeding 10 kV/mm (e.g., 20 kV/mm, 30 kV/mm, 50 kV/mm, 100 kV/mm, 200 kV/mm, 500 kV/mm, 1000 kV/mm, etc.).

In variants with an insulating coating, the insulating coating (e.g., total coating thickness, thickness for each coating when a plurality of coatings are used, etc.) is preferably between about 10 and 100 μm thick (e.g., 9 m, 15 μm, 20 μm, 30 μm, 50 μm, 75 μm, 90 μm, 100 μm, 105 μm, etc.). However, in some variations the coating thickness can be less than 10 μm or greater than 100 μm.

In some variants, the insulating material can include a plurality of coatings. These variants can provide a technical advantage of improving coefficient of thermal expansion matching between different coating layers, can improve mechanical or chemical protection or resilience of the insulating coating, can improve adhesion (e.g., between the base material and insulating coating, between catalyst and insulating coating, etc.), can improve electrical properties (e.g., dielectric strength, resistivity, etc.) of the insulating material, and/or can provide other technical benefits.

Figure 3A:
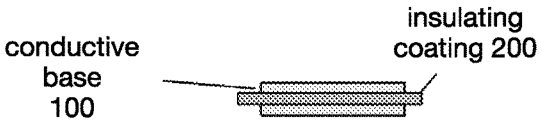
FIGS. 3A and 3B are schematic representations of planar views of exemplary variants of resistively heated elements including overhanging insulating materials.
Figure 3B:
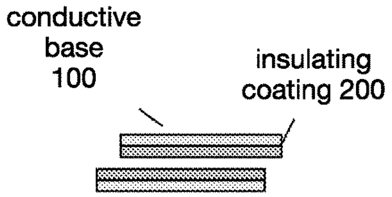

The insulating material preferably overhangs the base material (e.g., to hinder, prevent, etc. electrical shorting proximal edges of the base material). As a first example (as shown for instance in FIG. 3A), the insulating material can overhang the base material by a threshold distance. As a second specific example (as shown for instance in FIG. 3B), adjacent layers of base material (and thus insulating material disposed thereon) can be offset (such that insulating material is between adjacent base material regions). However, the insulating material can otherwise overhang, extend past the base material, and/or can otherwise be arranged.

The insulating material is preferably an oxide, silicide, and/or silicate, which can provide a technical advantage of minimizing degradation pathways or contamination of the resulting products with undesired materials. For instance, nitrides can be undesirable as they can degrade in water and/or can contaminate the products with nitrogen (particularly for reactions aiming to achieve greater than 99.9% purity of the final products without requiring further separations). Additionally or alternatively, the insulating material can be chosen to match a coefficient of thermal expansion for the base material, based on a toughness (e.g., durability, resilience, etc.) of the insulating material, a resilience of the insulating material to thermal stress, the electrical properties of the insulating material, a chemical stability of the insulating material, a chemical reactivity of the insulating material (e.g., ability to act as a catalyst support), a physical reactivity of the insulating material (e.g., sorption capacity of the insulating material to one or more reactant or product), and/or can otherwise be chosen. However (e.g., in variants where contamination is less problematic, in variations where the insulating material is inert to the reactants and/or products, etc.), the insulating material can additionally or alternatively include: nitrides, borides, carbides, phosphides, oxynitrides, oxycarbides, and/or other suitable ceramics. Exemplary insulating materials can include:

alumina, zirconia, ceria, yttria, ytterbia, lutetia, silica, zirconia stabilized alumina, yttria stabilized zirconia, mica, ceramic paper, and/or other suitable material(s) (e.g., green ceramics).

In some variants, the insulating coating can be a glass-ceramic composite. For instance, the insulating component can include a glass material and an insulating material (e.g., insulating material as described above). In these variants, the ratio (e.g., mass ratio, volume ratio, stoichiometric ratio, etc.) of the glass material to the insulating material is preferably between about 1:4 and 3:2. For example, an insulating coating can be 30-50% (by mass) glass and 50-70% (by mass) insulating material. However (e.g., depending on the material(s)), other suitable ratios may be achievable. Exemplary glass materials include: silicate glass, borosilicate glass, soda-lime glass, aluminosilicate glass, lead glass, germanium oxide glass, tellurite glass, phosphate glass, antimonate glass, arsenate glass, titanate glass, tantalate glass, fluoride glass, aluminate glass, and/or other suitable glass can be used (e.g., metallic glass). In some examples of glass-ceramic insulating coatings, the glass can act as an adhesive that connects (e.g., binds, adheres, attaches, etc.) the ceramic material together (e.g., instead or in addition to the ceramic material being annealed or sintered together). The glass material can additionally or alternatively be in the form of a glass frit containing a mixture of one or more glasses and/or oxides.

In some examples of the insulating coating (e.g., a ceramic material, a glass-ceramic composite, etc.), the insulating coating can have a CTE mismatch with the substrate (e.g., the insulating coating can have a lower CTE than the substrate) that can be engineered to maintain the insulating coating under compression (which can be beneficial for reducing crack formation and/or propagation). In one illustrative example of such, the CTE can be achieved based on the glass material, the glass frit (e.g., glass powder frit used to deposit the insulating coating), the ceramic material, the substrate material, a curing temperature, a curing pressure, and/or using other suitable parameters, However, the insulating coating and the substrate can have substantially the same CTE and/or the insulating coating can have a higher CTE than the substrate.

In some variants, the insulating material can include fibers (e.g., ceramic, glass, silica, basalt, etc. fibers; glass cloth, silica cloth, basalt cloth, etc.; etc.) which can function to improve mechanical, physical, chemical, and/or other suitable properties of the insulating material. The fibers can be woven and/or non-woven. In some examples of these variants, the fibrous material can include a sizing, binder, and/or adhesive (e.g., ceramic adhesive) to stabilize the fibers in specific regions of the insulating material (e.g., along edges, along a patterned region, proximal regions of high curvature, etc.).

In some variants, the insulating material can include patterning. The patterning in the insulating material can provide a technical advantage of reducing stress related failure from differential thermal expansion (e.g., differences in temperature, differences in coefficient of thermal expansion, differences in heat transport, etc.), increased surface area, promotion of controlled cracking, and/or can provide other technical advantages. For instance, perforations, indentations, scratches, slits, slots, and/or similar structures can be formed in the insulating material to act as expansion joints or to promote controlled cracking. In some variations, the patterning could be a result of different materials (e.g., different materials along the patterning region) or different inclusions (e.g., engineered positions for fiber inclusion in the insulating material).

The spacers 300 (e.g., structured layer) can function to retain or form (e.g., prior to curing) a shape and/or structure of the resistively heated reaction module, modify fluid flow properties through the resistively heated module, and/or can otherwise function. However, additionally or alternatively, the shape of the resistively heated reaction module can be retained by an enclosure, by the insulating material, by the base, and/or using other suitable retention mechanisms. The spacers can be formed from the same material as the base material, another suitable base material, the insulating material, another suitable insulating material, and/or other suitable materials. Typically, the spacer will form a fluid flow path that is between 0.1 and 10 mm in a direction orthogonal to the propagation direction of the fluid. However, the fluid flow path can have any suitable spacing.

As a specific example, a spacer can include (e.g., be made of, be composed of, etc.) conductive material (e.g., the same conductive material as the base, another suitable conductive material that could be used as a base, etc.). In variations of this specific example, the spacer can be electrically coupled to the electrodes such that the spacer is included in the electrical circuit (together with the base material) and can contribute to the resistive heating.

In one variant the spacer can have a corrugated pattern with a periodic or oscillating shape to cooperatively form flow channels with the base material. The shape of the spacer can be chosen such that the size and/or aspect ratio of the flow channels can promote the target chemical reaction(s) (e.g., accounting for reaction kinetics, conversion efficiency, flow rate, temperature, pressure, etc.). In variants, the spacers can form a sawtooth pattern, a sinusoidal wave, a square wave, a trapezoidal pattern, a zig zag pattern, and/or any other suitable shape. However, the shape of the spacer can otherwise be chosen.

In variants, the spacers can have a characteristic feature size (e.g., oscillation amplitude for corrugated material, etc.) between 0.01 mm and 10 mm (e.g., 0.01 mm, 0.05 mm, 0.1 mm, 0.5 mm, 1 mm, 2 mm, 3 mm, 4 mm, 5 mm, 6 mm, 7 mm, 8 mm, 9 mm, 10 mm, or any value and/or range therebetween). In variants, the feature size can be tuned to modify the amount of exposed surface area in a fluid flow path (e.g., to increase, decrease, or otherwise alter reaction rate.) For example, spacers with a smaller characteristic feature size can result in fluid flow paths with a smaller cross section that can result in the fluid flow paths having a higher surface area to volume ratio.

The active material 400 (e.g., catalyst, catalytic material) can include a catalyst material and sorbent that are preferably dual functional acting to sorb (e.g., absorb, adsorb) one or more reactants from a fluid stream and facilitate reaction of said reactants. However, the active material can provide a single function (e.g., when two or more active materials are leveraged, such as a combination of platinum group metals disposed on a high surface area support.) and/or can otherwise function. The active material is typically deposited on the base material and/or spacers. However, the active material(s) can additionally or alternatively be deposited or disposed on the insulating material, the electrodes, and/or on other suitable surfaces.

The active material can include a mixture of one or more components or materials (e.g., support materials) including high surface area (from about 10 to 1500 $m^2/g$) ceramic materials (e.g. gamma phase alumina, alumina etc.) that provides a high surface area support for the other materials, one or more catalysts, and/or one or more sorbent materials.

In general, the catalyst can depend on the reaction to be facilitated. However, a general use catalyst can be applied. Exemplary catalyst materials for carbon dioxide methanation can include: nickel, ruthenium, copper, iron, cobalt, zinc, palladium, platinum, rhodium, molybdenum, rhenium, gold, silver, manganese, chromium, tungsten, tungsten carbide, molybdenum carbide, titanium carbide, vanadium nitride, molybdenum nitride, nickel-cobalt alloy, nickel-iron alloy, ruthenium-cobalt alloy, nickel-copper alloy, perovskites (e.g., $LaNiO_3$, $LaCoO_3$, $SrTiO_3$), reduced perovskite derivatives, single-atom Ni on $CeO_2$, single-atom Ru on $TiO_2$, single-atom Co on $ZrO_2$, alumina, titania, zirconia, ceria, silica, $MgO—Al_2O_3$ mixed oxide, $CeO_2—ZrO_2$ mixed oxide, $TiO_2—ZrO_2$ mixed oxide, carbon nanotubes, graphene, potassium-promoted catalysts, lanthanum-promoted catalysts, or other suitable metal on a catalyst support (e.g., alumina, titania, zirconia, ceria, silica, etc.). As another specific example, the catalyst material(s) can include any suitable catalyst as described in U.S. patent application Ser. No. 18/822,253 titled “SYSTEM AND METHOD FOR SINGLE REACTOR CARBON DIOXIDE CAPTURE AND CONVERSION TO HIGH PURITY METHANE WITH POTENTIAL ISOTOPIC ENRICHMENT” filed on 1 Sep. 2024 which is incorporated in its entirety by this reference.

Exemplary sorbents can include: calcium-based materials (e.g., CaO, $CaO—Al_2O_3$, $CaO—ZrO_2$, $CaO—SiO_2$, calcium aluminate phases, limestone, dolomite, chalk, etc.), magnesium oxides and MgO mixed oxides, lithium ceramics (e.g., $Li_2ZrO_3$, $Li_4SiO_4$, etc.), hydrotalcite-derived mixed oxides (e.g., Mg—Al hydrotalcite, etc.), alkali and alkaline-earth carbonates and hydroxides (e.g., $Na_2CO_3$, $K_2CO_3$, etc.), supported and stabilized mixed oxides, zeolites and molecular sieves, carbonaceous sorbents, amine-functionalized solids, natural minerals (e.g., limestone, dolomite), waste-derived materials (e.g., slags, fly ash), bifunctional catalyst-sorbent composites (e.g., Ni—CaO, Ni-hydrotalcite), strontium, barium oxides, or any other suitable material.

In variants, the base material, spacers, insulating coating, and catalyst can be configured into a multilayer sheet. For example, the multilayer sheet can include two layers of base material with the spacers disposed between, an insulating coating surrounding the outer surfaces or outside facing surfaces of the multilayer sheet (e.g., the surfaces and/or sides of the two base material layers not in contact with the spaces, etc.), and the catalyst disposed on the internal surfaces of the multilayer sheet that define the fluid channels (e.g., the surfaces of the base material layers and spacers that don't include the insulating coating).

The electrodes 500 (e.g. cylindrical electrode, first electrode, second electrode, bus bar 510, etc.) function to provide electricity to the resistively heated thermal module (e.g., interfacing between an energy source and the resistively heated thermal module). The resistively heated thermal module preferably includes at least two electrodes (e.g., an anode and a cathode), but can include any suitable number of electrodes (e.g., reference electrodes, sensor electrodes, etc.). Typically, the anode and cathode are opposing ends of the resistively heated thermal module along the length (as shown for example in FIG. 2A, 2B, 2C, or 2D). However, the anode and cathode can be at opposing ends of the resistively heated thermal module along a width and/or could have other suitable configurations. The electrodes can be arranged in a center of the resistively heated thermal module, along an edge or exterior of the resistively heated thermal module, and/or can otherwise be arranged.

The electrodes can be made from the same material as the base, and/or can be made of other suitable base material (or other suitable conductive material). In a specific example, when an iron-chromium-aluminium electrode is used for both the electrode and the conductive base, the cross-sectional area of the electrode is preferably greater than the area of the conductive base.

Figure 4A:
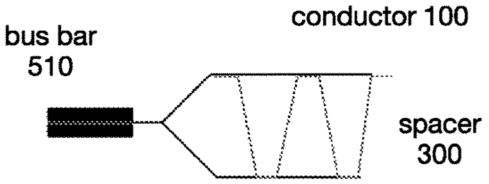
FIGS. 4A and 4B are schematic representations of exemplary bus bar arrangements for connecting to conductor material.
Figure 4B:
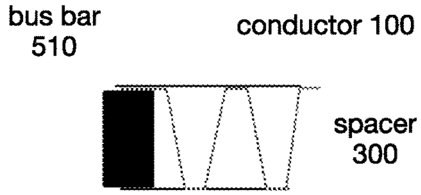
Figure 6A:
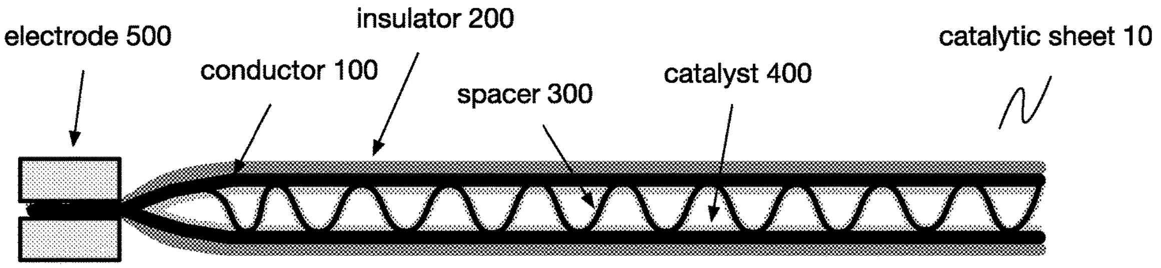
FIGS. 6A, 6B, and 6C are schematic representations of variants of attaching an electrode to the conductive base material.
Figure 6B:
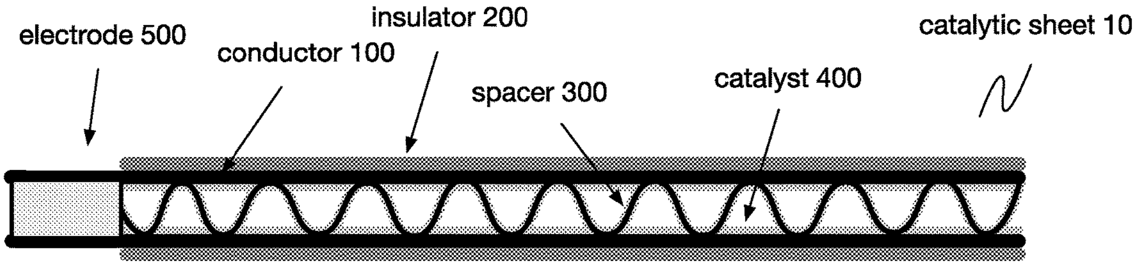
Figure 6C:
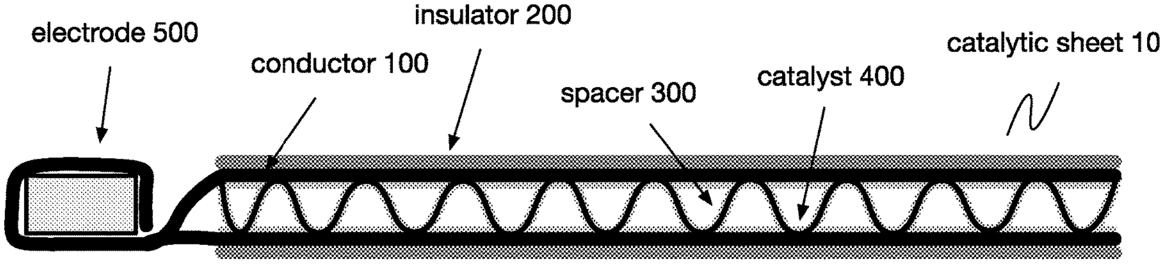

As shown for instance in FIG. 4A, the electrode (e.g., represented in the drawing as "busbar" 510) preferably encloses conductive bases and/or spacers (e.g., bringing the conductive base together around a spacer). However, the electrode can be arranged inside the spacer region (as shown for instance in FIG. 4B and FIG. 6B) and/or can otherwise be arranged. For example, the conductive base may wrap around the electrodes as shown for example in FIG. 6C. In variants, the electrodes can be brazed to (e.g., using a brazing paste, brazing foil, etc.) the resistively heated thermal module (e.g., in particular the base thereof), welded to (e.g., ultrasonic welding, laser welding, resistance welding, etc.) the resistively heated thermal module (e.g., in particular the base thereof), soldered to the resistively heated thermal module (e.g., in particular the base thereof), crimped to the resistively heated thermal module (e.g., in particular the base thereof), riveted to the resistively heated thermal module (e.g., in particular the base thereof), and/or can otherwise be attached to the resistively heated thermal module (e.g., in particular the base thereof). In variants, the electrode can be connected to the resistively heated thermal module (e.g., in particular the base thereof) using clamps, screw, brackets, and/or any other mechanical attachment mechanism. In variants, the electrodes can function as a clamp and clamp onto the resistively heated thermal module (e.g., in particular the base thereof, for example as shown in FIG. 6A). In another variant, the conductive base material of the resistively heated thermal module can wrap around or be mechanically attached to and/or soldered, brazed, or welded, to the electrode to establish an electrical connection. In variants, the electrodes can be attached to the resistively heated thermal module (e.g., in particular the base thereof) using the same mechanism or different mechanisms.

In variants, the base material, spacers, insulating coating, and catalyst, can be configured as a multilayer sheet 10 (e.g., catalytic sheet 10, layered sheet, sheet, etc.) with the electrodes in electrical connection with the base material of the multilayer sheet. For example, a first electrode can be attached (e.g., welded to, clamped on, crimped to, etc.) to a first edge of the multilayer sheet while a second electrode can be attached to a second edge opposing the first edge of the multilayer sheet. Alternatively, electrodes can be attached to adjacent edges of the multilayer sheet, at the same edge of the multilayer sheet, or in any other configuration. In other variants, electrodes can attached to a face of the multilayer sheet (e.g., as opposed to the edge).

Figure 5A:
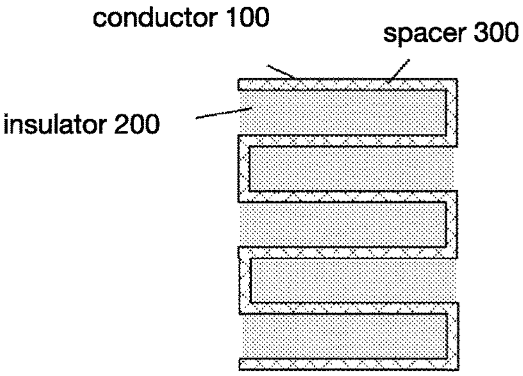
FIGS. 5A and 5B are schematic representations of cross-sectional views of exemplary resistive heating elements.
Figure 5B:
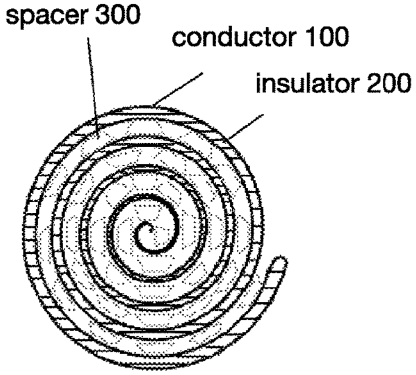
Figure 9A:
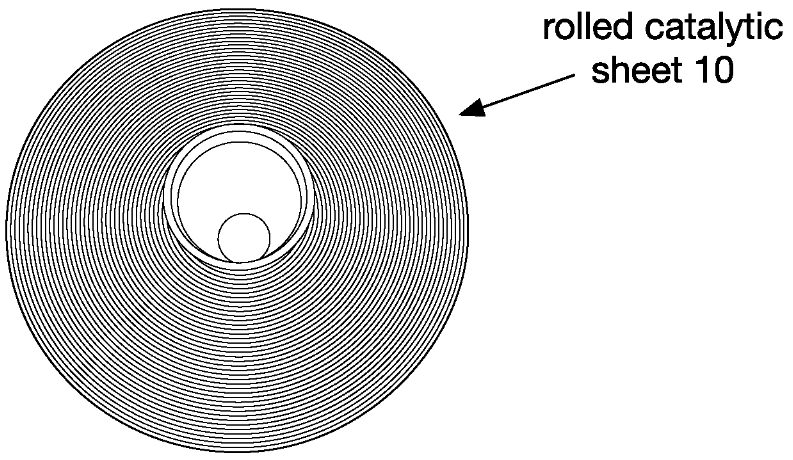
FIG. 9A is a picture of a variant of the system

In variants the thermal reactor module materials (e.g., base, spacers, insulating coating, etc.) can be configured (e.g., molded, folded, bent, rolled, etc.) into a geometry or structure. For example, the multilayer sheet can be bent, folded, or otherwise manipulated into a cylindrical (as shown for example in FIG. 9A), prismatic, and/or spherical geometry. In different variants, the thermal reactor module can have a rolled structure (e.g., spiral as shown for instance in FIG. 2A or FIG. 5B, double-spiral as shown for instance in FIG. 2B, etc.), helical structure, boustrophedonic structure (e.g., layered structure as shown for instance in FIG. 2C or FIG. 5A), a space-filling structure (e.g., approximating a Hilbert curve as shown for instance in FIG. 2D, approximating a Peano curve, approximating a Morton curve, approximating a Moore curve, etc.), and/or other suitable structure.

In a preferred variant, the insulating coating of the thermal reactor module is configured such that it provides turn-to-turn insulation (e.g., turn insulation, winding insulation, inter-turn insulation, layer insulation, etc.) of the base conductive material of the thermal reactor module. For example, in a variant in which the thermal reactor module is configured as a rolled multilayer sheet, the insulating coating can be applied on the outer surfaces of the multilayer sheet such that, when rolled, the insulating coating is at the interface between each turn of the multilayer sheet such that the conductive base material of the multilayer sheet is never in contact with the conductive base material of adjacent turn and/or layers. This turn-to-turn insulation can provide a technical advantage of facilitating the entire thermal reactor module to heat, without the electrical current traveling in a shortened path that prevents resistive heating of the entire thermal reactor module. Similar benefits can result from other arrangements of the thermal reactor module with other tortuous electrical paths (e.g., boustrophedonic, serpentine, space filling curve, etc.). In particular, shaping the multilayer sheet to form a tortuous path (with dielectric or insulating material between adjacent layers) can enforce the current flow along a tortuous path through the length of the conductive base material, rather than a direct (e.g., linear path) between electrodes. Such a tortuous path can be nonlinear and nondirect, requiring current to traverse multiple turns, bends, or meandering sections of the conductive material before reaching the opposing electrode. By enforcing this extended and circuitous electrical path, resistive heating is distributed more uniformly across the entire reactor module.

In variants, the system can optionally include an exterior housing 600 (e.g., casing, tube, sheath, etc.). The exterior housing can function to apply a compressive force that holds the thermal reactor components (e.g., base, spacers, coatings, etc.) together. For example, in a specific example, a thermal reactor configured as a rolled multilayer sheet can be encased in a cylindrical housing to ensure all the layers of the rolled multilayer sheet are held together and to ensure that the multilayer sheet does not unroll. In variants, the exterior housing can be made of stainless steel, steel, carbon steel, Inconel, Hastelloy, titanium, aluminium, alumina, zirconia, silicon carbide, mullite, boron nitride, metal—ceramic composites, metal alloys, Teflon, PEEK, polyimide, fused silica, quarts, and/or any suitable material.

Figure 9B:
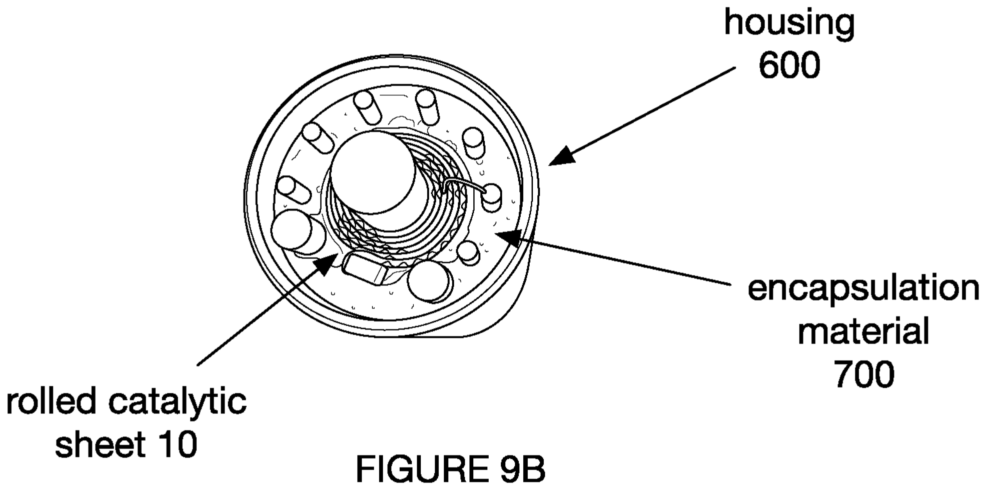
FIG. 9B is a pictures of a variant of the system, including a housing and an insulating and/or encapsulation material.

In other variants, the system can optionally include an encapsulation material 700 (e.g., heat sink material, outer insulating material, etc.) as shown for example in FIG. 9B. The encapsulation material can function to provide structural support, prevent heat loss, or have any other suitable function. The encapsulation material can surround the components of the thermal reactor and, in variants that include a housing, can fill space between the thermal reactor components and the housing (e.g., to provide structural support). The encapsulation material can include cement, plaster, concrete, mortar, sand, ceramic, alumina, zirconia, silicon nitride, boron nitride, glass, epoxy resins, and/or any suitable material.

5. Method of Manufacture

As shown in FIG. 10, a resistively heated element can be formed by preparing an insulating coating solution S100, depositing the insulating coating on a base S200, and curing the insulating coating S300 (e.g., while maintaining a target structure of the base or resistively heated element). Additionally or alternatively, an insulating material can be connected to (e.g., adhered to, attached to, bonded to, rigidly connected with an offset from, forming a separate layer that does not directly form chemical bonds with, etc.) the base (and/or other suitable substrate).

All or portions of the method can be performed continuously and/or in batches. All or portions of the method can be performed automatically, manually, semi-automatically, and/or otherwise performed.

Preparing an insulating coating solution S100 can function to prepare a solution for depositing a coating on a base. The insulating coating solution can be a slip, paste, slurry, suspension, colloidal solution, mixture (e.g., include dissolved material), and/or can have other suitable composition. The insulating coating solution can include: insulating material (e.g., dissolved species to form the insulating material upon curing; particles, flakes, etc. of insulating material suspended in solution; etc. such as insulating materials as described above), binder (e.g., a material that can function to improve holding materials together), surfactants (e.g., to modify a surface tension or interfacial tension of the solution), a dispersant (e.g., a material that can improve separation of insulating material, hinder aggregation or agglomeration of insulating material, hinder settling or clumping, etc.), deflocculants (e.g., to hinder settling of insulating material from solution), plasticizers (e.g., a material that decreases viscosity of the solution, improve plasticity of a green body, improve flexibility of a green body, etc.), and/or other suitable materials can be included. The insulating coating solution can be received fully prepared (e.g., as a mixture, dispersion, etc.), can be prepared fresh for each instantiation of the method (e.g., by mixing, stirring, blending, combining, etc. the target materials), and/or can otherwise be prepared.

Exemplary solvents include: water, ethanol, methanol, toluene, methyl ethyl ketone, xylenes, 1,1,1-trichloroethylene, 1,1,2 methyl pyrrolidone, acetone, cyclohexanone, butanol, methyl isobutyl ketone, isopropanol, propanol, nitropropane, combinations thereof, and/or other suitable solvents or solvent systems (e.g., azeotropic solvent mixtures) can be used.

Exemplary binders include: polyvinyl butyral (PVB), polyacrylate esters, polypropylene carbonate, polymethyl methacrylate, polyethyl methacrylate, polyvinyl alcohol, polyvinyl chloride, vinyl chloride-acetate, petroleum resin, polyethylene, ethylene oxide polymer, polytetrafluoroethylene, poly-alpha-methyl-styrene, polyisobutene, polyurethane, Atactic poly(propylene)/poly(butene), cellulose acetate-butyrate, nitrocellulose, methyl cellulose, ethyl cellulose, hydroxyethyl cellulose, hydroxypropyl ethyl cellulose, latex, waxes, silicone, and/or other suitable binders can be used.

Exemplary surfactants, deflocculants, and/or dispersants can include: polyisobutylene, linoleic acid, oleic acid, citric acid, stearic acid, lanolin fatty acids, salts of polyacrylic acids, salts of polymethacrylic acids, blown menhaden fish oil, corn oil, safflower oil, linseed oil, glycerol trioleate, synthetic waxy esters, pH adjustments, sodium silicate, dibutyl amine, substituted imidazolines, sulfonates, aliphatic hydrocarbons, 2-amino-2-methyl-propan-1-ol, polyethylene glycol, polypropylene glycol, polybutylene glycol, polyvinyl butyral, sodium sulfosuccinates, ethoxylate, phosphate ester, glycerol tristearate, combinations thereof, and/or other suitable surfactants, deflocculants, and/or dispersants can be used.

Exemplary plasticizers can include: dibutyl phthalate, dioctyl phthalate, butyl benzyl phthalate, mixed ester phthalates, dimethyl phthalate, (poly)ethylene glycol, polyalkylene glycol, (poly)propylene glycol, triethylene glycol, dipropylglycol dibenzoate, (poly)butylene glycol, polyoxymethylene, ethyltoluene sulfonamides, glycerine, tri-n-butyl phosphate, butyl stearate, methyl abietate, tricresyl phosphate, propylene carbonate, water, combinations thereof, and/or other suitable plasticizers.

Note that a material can be added to the solution and serve more than one function (e.g., a surfactant can also act as a plasticizer).

The insulating coating solution is typically at least 60% (e.g., 65%, 70%, 75%, 80%, 90%, values or ranges therebetween, etc.; where percentage can refer to mass percent, volume percent, stoichiometric percent, etc.) insulating coating materials (e.g., ceramic material, ceramic powder, ceramic particles, glass-ceramic material, glass powder, metal powder, etc.); where the remaining 40% can include solvent, binder surfactant, plasticizer, deflocculant, dispersant, and/or other species (e.g., organic species). However, some variations can use other compositions for the insulating coating solution.

Depositing the insulating coating on a base S200 functions to coat the base with the insulating coating. The insulating coating is preferably deposited using an insulating material coating (e.g., from S100). However, the insulating coating can be gas deposited, plasma deposited, solid deposited, and/or deposited from any suitable source and/or in any suitable manner.

S200 preferably includes tape-casting the insulating coating (e.g., dropping the liquid solution of insulating material on base and using a doctor blade or other instrument to remove excess insulating material solution from the base). However, S200 can additionally or alternatively include: tape casting the insulating coating onto a backer (e.g., mylar) and transferring (e.g., laminating) the insulating coating onto the base, printing the insulating coating, screen processing the insulating coating, dip coating the insulating coating, chemical vapor deposition of the insulating material, atomic layer deposition of the insulating material, spray deposition of the insulating material, plasma deposition of the insulating material, flame deposition of the insulating material, and/or other suitable deposition processes.

In some variants, S200 can include patterning the insulating material (which can provide technical advantages in improving insulating material uniformity during or after curing). For example, the insulating material can be patterned using laser etching, mechanical scraping, printing processes (e.g., rollers, screens, etc.), structured doctor blade (e.g., one or more needles, protrusions, etc. that can optionally have adjustable positions and result in differential scraping of the insulating material solution at different locations of the insulating material), and/or other suitable patterning processes can be used. As an illustrative example, the deposited insulating material can be patterned to include expansion joint regions. However, the deposited insulating material can otherwise be patterned.

Depositing the insulating coating on a base can include one or more pre-treatment steps for the base (e.g., prior to the deposition of the insulating coating thereon). For instance, the base can be pre-fired (e.g., to form a native oxide layer on the surface of the base), patterned (e.g., surface roughened, perforated, cut, machined, corrugated, etc.), and/or can otherwise be processed prior to insulating material deposition.

In some variants, a plurality of insulating materials (and/or other suitable coating materials) can be deposited on the base (either directly or indirectly such as on a separate substrate before subsequent transfer to the base). Typically, the coatings are added sequentially (e.g., to form a layered coating). In some examples, the coatings can be cured (e.g., according to S300) before subsequent coatings are applied. However, the coatings could be added contemporaneously (e.g., local deposition of added or differential materials such as to pattern a coating such as depositing fibers to stabilize or form regions of differential mechanical, electrical, thermal, chemical, etc. properties).

Figure 7:
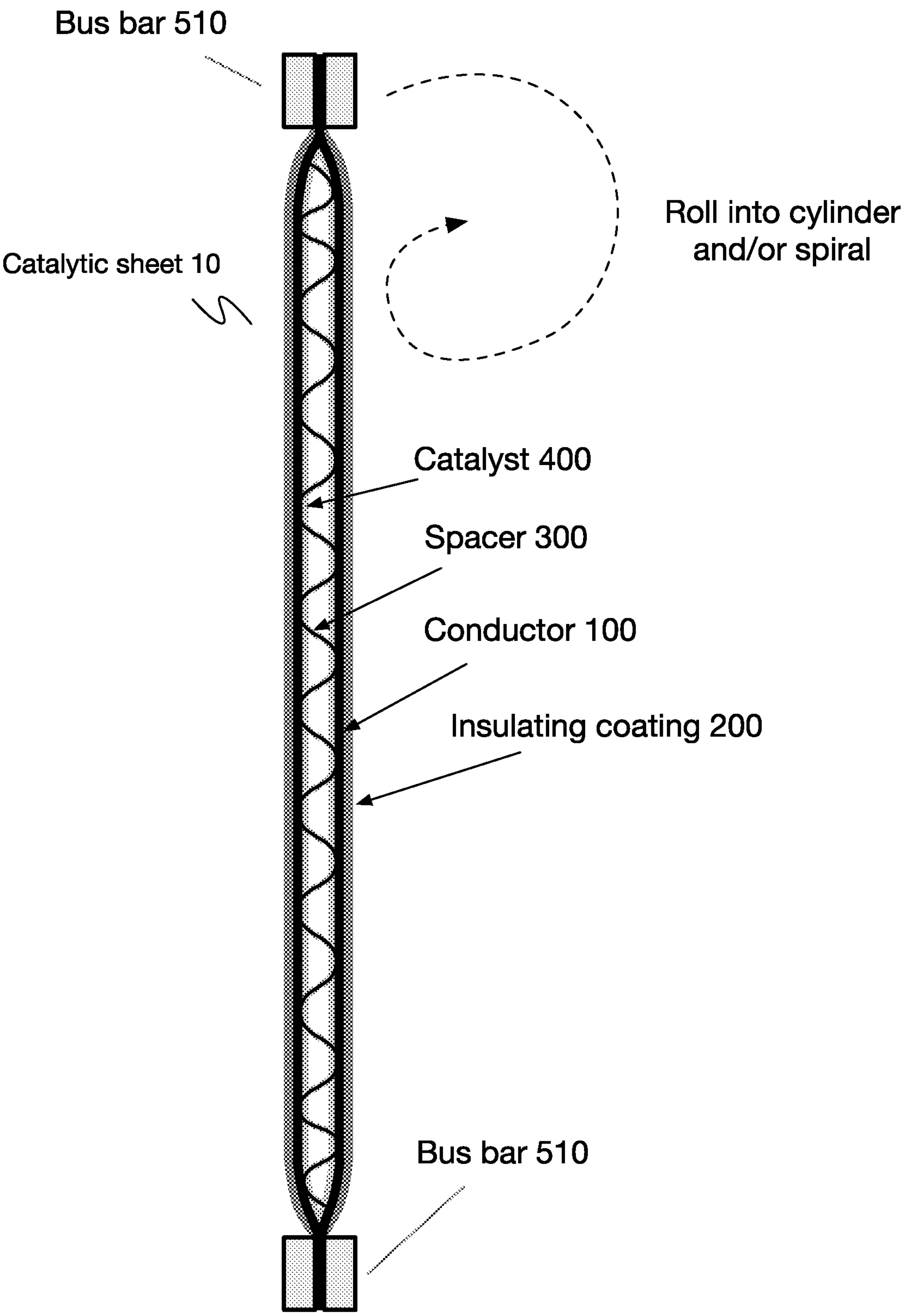
FIG. 7 is a schematic representation of a variant of the thermal reactor components prior to being shaped.

In variants, the method of manufacture can include shaping (e.g., molding, rolling, bending, folding, etc.) the base. For example, after applying the insulating coating, the coated based material can be shaped into a new geometry. In variants, this step can be performed prior to curing the insulating coating S300 so that that insulating coating remains in a malleable state. However, in variants the base material can be shaped prior to coating (e.g. coating the base material after it is shaped, etc.) or after the coating is cured (e.g., after S300, etc.). In variants, the base materials can be shaped into a prismatic geometry (e.g., rectangular prism, etc.), cylindrical geometry (e.g., by rolling, as shown for example in FIG. 7), spherical geometry, and/or any suitable geometry. In variants, the shaped base can create a layered structure (e.g. a roll, a boustrophedonic prism, etc.). In these variants, the insulating coating is preferably disposed between each layer of the structure (e.g., to prevent the base material from being in contact with itself in different layers) to form turn-to-turn insulation, winding insulation, or layer insulation. The inventors have found that this prevents electrical current shorting during the resistive heating of the thermal reactor, which can provide a technical advantage of enhanced uniformity of heating during operation of the thermal reactor.

Figure 8:
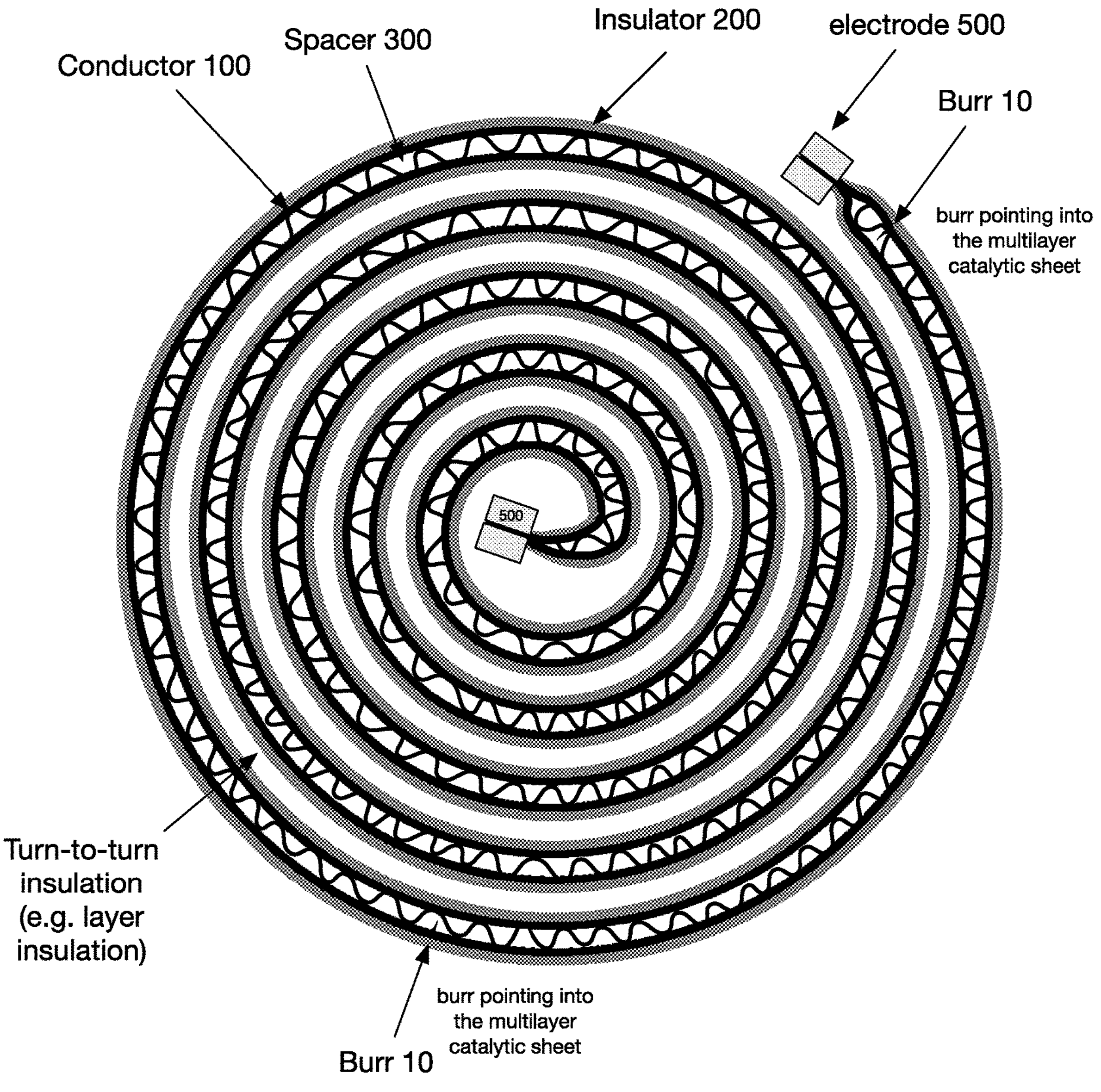
FIG. 8 is a schematic representation of a variant to the thermal reactor. Gaps are shown between the layers of the spiral for depictive purposes. In variants, the adjacent layers are typically in intimate contact.

In variants, the base is shaped in a way to prevent puncturing or breaching of the insulating coating. For example, in variants, the base can contain burrs 10 (e.g., sharp points, a sharp ridges, spikes, bumps, etc., where burrs are particularly (but not exclusively) problematic when they have a height of similar size as or greater than the thickness of the insulating coating) from manufacturing and/or machining of the base material (e.g., cutting, etc.). In these variants, the base can be shaped and/or arranged such that the burrs do not make contact with other layers (e.g., adjacent turns, etc.) of the base while in its shaped structure. For example, the base material and/or catalytic sheet can be assembled in a way that the burrs face inward (e.g., toward other conductive material of a given layer or roll, etc.) so that the burrs are unable to puncture through the insulating coating and make contact with the base material of an adjacent layer, as shown for example in FIG. 8. However, burrs can be removed (e.g., via sanding, subtractive manufacturing, etc.) and/or otherwise be handled (e.g., have additional insulating material deposited thereon, degraded during application of or via electrical current, etc.).

Curing the insulating coating S300 functions to treat the deposited coating (e.g., insulating material, from S200, etc.) to form a finished insulating coating on the base. For instance, curing can include one or more steps that can function to burn off materials other than the coating (e.g., binders, surfactants, plasticizers, dispersants, deflocculants, etc.), evaporate solvent from the coating, anneal and/or sinter particles of the coating together, bond the coating to the base (or other coating), and/or can otherwise function.

Typically, thermal curing is used (e.g., heating the base and coating to a temperature between 200° C. and 3000° C.). The thermal curing can include one or more temperature steps with controlled ramp rates (e.g. between 50° C./hr and 1000° C./hr) between the steps. For example, one thermal curing process could include a burn off step (e.g. at temperatures between 200° C. and 600° C.) and a sintering step (e.g. at temperatures between 1100° C. and 1800° C.). However, additionally or alternatively electrical curing, optical curing, and/or other suitable curing processes can be performed.

In some variants (e.g., to form a glass-ceramic composite as the insulating coating), thermally curing can include heating the insulating coat to a temperature that is above the melting temperature of the glass of the composite but below a melting point of the substrate (and often below a sintering or annealing temperature of the ceramic). As an illustrative example, to cure a glass-ceramic composite that is formed from a borosilicate glass and aluminium oxide, a temperature between 800 and 1250° C. can be used. In this illustrative example, the borosilicate glass can melt and then solidify after cooling acting to hold (e.g., bind, adhere, etc.) the ceramic material together. However, other suitable temperature can be used (e.g., depending on the materials such as depending on a frit of the glass material).

Typically, S300 is performed after the base (with green body of the coating) is shaped. For instance, S300 is preferably performed on a rolled base with a green body of the coating applied (as the green body will typically have better flexibility than the cured coating). For example, the insulating coating can be applied to the base material (e.g., a multilayer sheet including layers of conductive base material, and spacers) in a green state, the coated material can then be shaped (e.g., folded, rolled, bent, etc.) while the coating is still in a green state, and finally in the shaped form the insulating coating can be cured. However, S300 could be performed prior to shaping the base (e.g., with a base with a cured coating).

In variants where the thermal reactor module includes an active material, the active material can be deposited before, during, and/or after S300. The active material can be deposited in any manner analogous to the coating deposition processes (e.g., tape casting, dip coating, wash coating, spray coating, spin coating, chemical vapor deposition, sputtering, physical vapor deposition, plasma-enhanced chemical vapor deposition, printing, screening, etc.).

In one specific example, a method of reactor assembly can include a flow of fluid past an active coating whereas heat is provided to the endothermic process by flowing electrons in a substantially orthogonal direction to fluid flow. In a variation of this specific example the orthogonal flow of electrons can follow a circular flow path that rolls into layers forming a substantially cylindrical reactor where the process fluid flow flows past an active coating from the inlet to outlet.

6. Method of Operation

As shown in FIG. 11, the method of operation can include: heating the thermal reactor S1000 and introducing the reactants to the thermal reactor S2000. In variants, the method can include monitoring the reaction parameters and/or conditions. The method functions to perform a reaction using the thermal reactor. In examples, example of reactions can include converting biogas into syngas, reverse-water gas shift reaction, hydrocarbon reforming (e.g., steam methane reforming, dry methane reforming, etc.), Haber process, Kværner process, methanation of oxygenated carbon, ethylene steam cracking, nonoxidative coupling of methane, temperature swing adsorption processes, direct air capture (and desorption), hydrocarbon cracking, surface flow reactions, and/or other suitable processes (particularly using gas phase reactants and ideally gas phase products, endothermic reactions such as ammonia cracking process). The method can be performed continuously, in batches, intermittently, at some predetermined interval, sporadically, in response to a request and/or trigger, or in any other suitable manner. The method is preferably applied to a thermal reactor as described above, however, the thermal reactor can be operated in another manner and/or other thermal reactor designs may be operated in variants of the method of operation.

Heating the thermal reactor S1000 functions to heat the thermal reactor to a predetermined reaction temperature. Heating can be performed before introducing reactants, during reactant introduction, during the reaction, or at any time. Heating can be performed continuously (e.g., throughout the reaction, etc.), intermittently, in response to a trigger (e.g. when a sensor measures that the temperature is below a predetermined temperature), and/or any other suitable heating method. Heating the thermal reactor can be controlled based on time, temperature profile, or reaction progress.

The thermal reactor (e.g., reaction module) can be heated to a temperature between 50° C. and 3000° C. (e.g., 50° C., 60° C., 70° C., 80° C., 90° C., 100° C., 200° C., 300° C., 400° C., 500° C., 600° C., 700° C., 800° C., 900° C., 1000° C., 1100° C., 1200° C., 1300° C., 1400° C., 1500° C., 1600° C., 1700° C., 1800° C., 1900° C., 2000° C., 2500° C., 3000° C., or any value and/or range therebetween). The temperature can alternatively be less than 50° C. or greater than 2000° C. depending on the type of reaction and/or other reaction conditions. Heating the thermal reactor can be ramped gradually or applied in a stepwise manner to avoid thermal stress. The thermal reactor can include multi-zone heating to maintain uniform temperature across the module. In variants, heating the thermal reactor can include resistively heating a catalytic material. In other variants, heating the thermal reactor can be performed using inductive heating, microwave heating, dielectric heating, infrared heating, convective heating, or any other suitable method. Heating the thermal reactor can be otherwise performed.

In variants, heating the thermal reactor includes supplying electricity to the thermal reactor to resistively heat the reaction module. Supplying electricity to the thermal reactor to resistively heat the reaction module is preferably performed using an AC power source, but alternatively, an DC power source can be used. The supplied electricity can have a voltage between 0.1 and 5000 volts (e.g., 0.1 V, 0.5 A, 1 V, 10 V, 20 V, 30 V, 40 V, 50 V, 60 V, 70 V, 80 V, 90 V, 100 V, 200 V, 300 V, 400 V, 500 V, 600 V, 700 V, 800 V, 900 V, 1000 V, 2000 V, 3000 V, 4000 V, 5000 V, or any value and/or range therebetween). The voltage can alternatively be less than 0.1 volts or greater than 5000 volts (to achieve lower or higher predetermined temperatures). The dimensions (e.g. length, thickness and/or any other dimensions) of the thermal module, base material and/or spacers can be selected such that the required voltage matches an available electrical distribution voltage (e.g., 100 V, 120 V, 208 V, 240 V, 277 V, 300 V, 380 V, 400 V, 480 V, 500 V, 600 V, 2.4 kV, 4.16 kV, or any other electrical distribution voltage). The electricity supplied to the thermal reactor can generate a current between 0.1 and 1000 amperes (e.g., 0.1 A, 0.5 A, 1 A, 2 A, 3 A, 4 A, 5 A, 6 A, 7 A, 8 A, 9 A, 10 A, 20 A, 30 A, 40 A, 50 A, 60 A, 70 A, 80 A, 90 A, 100 A, 200 A, 300 A, 400 A, 500 A, 600 A, 700 A, 800 A, 900 A, 1000 A, or any value and/or range therebetween). The electricity supplied to the thermal reactor can provide a current density between 0.01 and 1000 $A/mm^2$ (e.g., 0.01 $A/mm^2$, 0.05 $A/mm^2$, 0.1 $A/mm^2$, 0.5 $A/mm^2$, 1 $A/mm^2$, 2 $A/mm^2$, 3 $A/mm^2$, 4 $A/mm^2$, 5 $A/mm^2$, 6 $A/mm^2$, 7 $A/mm^2$, 8 $A/mm^2$, 9 $A/mm^2$, 10 $A/mm^2$, 15 $A/mm^2$, 20 $A/mm^2$, 30 $A/mm^2$, 40 $A/mm^2$, 50 $A/mm^2$, 60 $A/mm^2$, 70 $A/mm^2$, 80 $A/mm^2$, 90 $A/mm^2$, 100 $A/mm^2$, 500 $A/mm^2$, 1000 $A/mm^2$ or any value and/or range therebetween). However, the supplied electricity can have any suitable voltage, current, and/or current density.

The supplied electricity can be controlled (e.g., modified, altered, adjusted, fluctuated, switched on and off, etc.) to maintain the predetermined temperature. For example, in variants, measurements from a temperature sensor can be used in a feedback control loop to regulate the supplied electrical power (e.g., adjusting the supplied voltage and/or current) to maintain the predetermined temperature. In other variants, the control can include ramping, pulsing, or cycling the supplied electricity. However, the supplied electricity can be otherwise controlled for purposes other than maintaining the predetermined temperature (e.g., to achieve target products or product distribution, enable electrochemical reactions or electric fields to modify chemical reactions, etc.). However, supplying electricity to the thermal reactor to resistively heat the reaction module may be otherwise performed.

However, heating the thermal reactor S1000 can be otherwise performed.

Introducing the reactants to the thermal reactor S2000 functions to expose the reactants to conditions within the thermal reactor that can allow one or more reaction to occur. Introducing the reactants to the thermal reactor can be performed by valves, pumps, mass flow controllers, nozzles, injector, and/or any suitable equipment. Reactants can be introduced when the thermal reactor reaches the predetermined temperature, after the thermal reactor has stabilized to the predetermined temperature, while the thermal reactor is heating, contemporaneously and/or simultaneously with S1000, asynchronously of S1000, and/or at any other time. Reactants can be introduced continuously, in batches, intermittently, sporadically, cyclically, and/or using any other method. In examples of introducing the reactants to the thermal reactor, reactants include carbon dioxide ($CO_2$), carbon monoxide (CO), hydrogen ($H_2$), nitrogen ($N_2$), oxygen ($O_2$), water vapor (steam, $H_2O$), ammonia ($NH_3$), air, hydrocarbons (e.g., methane, ethane, propane, butane, pentane, hexane, heptane, naphtha, kerosene, gas oil, or other $C_1$-$C_{20}$ alkanes or alkenes), oxygenated carbon compounds (e.g., methanol, ethanol, formaldehyde, formic acid), syngas mixtures (e.g., $H_2$+CO potentially including $CO_2$ and/or $CH_4$), acetylene ($C_2H_2$), ethylene ($C_2H_4$), or combinations thereof. In variants, inert gases and/or carrier gases (e.g., $N_2$, Ar, He, etc.) can be used to dilute reactants and/or control heat and/or mass transfer. In other variants, oxidizing and/or reducing gases (e.g., oxygen, carbon monoxide, water, sulfur oxides, nitrogen oxides, hydrogen, etc.) can be introduced with the reactants. The reactants can be pre-heated before entering the thermal reactor. In variants when multiple reactants are used, multiple reactant streams can be mixed before or inside the reactor. In variants, reactant ratios (stoichiometry) can be adjusted in real time, modified dynamically, or otherwise controlled.

The reactants can be introduced to the thermal reactor (e.g. reaction module) with a flow rate between 0.1 and 50,000 L/min (e.g., 0.1 L/min, 0.5 L/min, 1 L/min, 2 L/min, 3 L/min, 4 L/min, 5 L/min, 6 L/min, 7 L/min, 8 L/min, 9 L/min, 10 L/min, 20 L/min, 30 L/min, 40 L/min, 50 L/min, 60 L/min, 70 L/min, 80 L/min, 90 L/min, 100 L/min, 250 L/min, 500 L/min, 750 L/min, 1000 L/min, 5000 L/min, 10,000 L/min, 20,000 L/min, 30,000 L/min, 40,000 L/min, 50,000 L/min, or any value and/or range therebetween). The flow rate can alternatively be less than 0.1 L/min or greater than 100 L/min (e.g., depending on the reaction rate, the reaction conditions, thermal reactor size, etc.). The reactants can be introduced at a pressure between 0.1 bar and 200 bar (e.g. 0.1 bar, 0.5 bar, 1 bar, 5 bar, 10 bar, 20 bar, 30 bar, 40 bar, 50 bar, 60 bar, 70 bar, 80 bar, 90 bar, 100 bar, 110 bar, 120 bar, 130 bar, 140 bar, 150 bar, 160 bar, 170 bar, 180 bar, 190 bar, 200 bar, or any value and/or range therebetween).

The reactants can have residence time in the thermal reactor between 0.1 second and 5 hours (e.g., 0.1 sec, 1 sec, 5 sec, 10 sec, 30 sec, 1 min, 5 min, 10 min, 20 min, 30 min, 45 min, 1 hr, 1.5 hr, 2 hr, 3 hr, 4 hr, 5 hr, or any value and/or range therebetween). The residence time can alternatively be less than 0.1 second or greater than 5 hours depending on the reaction. The reaction can be carried out at a gas hourly space velocity or weight hourly space velocity between 0.1 and 100,000 $h^{-1}$ (e.g., 0.1 $h^{-1}$, 0.5 $h^{-1}$, 1 $h^{-1}$, 5 $h^{-1}$, 10 $h^{-1}$, 50 $h^{-1}$, 100 $h^{-1}$, 200 $h^{-1}$, 300 $h^{-1}$, 400 $h^{-1}$, 500 $h^{-1}$, 600 $h^{-1}$, 700 $h^{-1}$, 800 $h^{-1}$, 900 $h^{-1}$, 1000 $h^{-1}$, 2000 $h^{-1}$, 3000 $h^{-1}$, 4000 $h^{-1}$, 5000 $h^{-1}$, 6000 $h^{-1}$, 7000 $h^{-1}$, 8000 $h^{-1}$, 9000 $h^{-1}$, 10000 $h^{-1}$, 20000 $h^{-1}$, 50000 $h^{-1}$, 100000 $h^{-1}$, or any value and/or range therebetween). In variants, the flow rate of reactants can be adjusted to achieve a desired residence time, e.g., corresponding to a GHSV of about 100 to about 100,000 $h^{-1}$ or a WHSV of about 0.1 to about 100 $h^{-1}$. Introducing the reactants to the thermal reactor can be performed using any suitable method. However, introducing the reactants to the thermal reactor can be otherwise performed.

The method can optionally include monitoring the reaction parameters and/or conditions, which can function to measure, record, and/or track one or more reaction parameters. In variants, this can provide a user and/or a control system with information about the thermal reactor to enable better control and/or more responsive control. Monitoring reaction parameters can be performed using temperature sensors, voltage sensors, current sensors, resistance sensors, mass sensors, composition sensors, pressure sensors, and/or any other suitable type of sensor. The sensors can measure the inlet reactants, the outlet products (and/or residual reactants), the chemical species within the thermal reactor, the thermal reactor, and/or other suitable species or components of the thermal reactor. Monitoring the reaction parameters can be performed continuously, intermittently, at a predetermined interval, sporadically, or in response to a trigger. In variants monitoring the reaction parameters can be performed continuously throughout the method (e.g., during S1000 and S2000), during S1000, during S2000, or at any suitable time. Measurements from monitoring reaction parameters can be used to adjust the supplied electricity to maintain a predetermined temperature or current density, modify reactant flow rates or pressures, trigger safety cutoffs or alarms in the event of abnormal conditions, optimize reaction efficiency or selectivity, control the timing of multistep reactions or sequences, for process monitoring, modeling, or predictive maintenance. However, the measurements can be used to perform any suitable function. In variants, the sensors can be part of a feedback loop or control system configured to regulate one or more operating parameters. The control system can include programmable logic controllers (PLCs), microcontrollers, computers, or other suitable modules. The control system can adjust electricity (e.g., voltage, current, power, etc.), flow rates, pressures, reactant composition, and/or other suitable control variable to maintain a desired setpoint or profile. The feedback loop can be continuous, periodic, or triggered by specific events. However, the sensors can be otherwise utilized. Monitoring reaction parameters can be otherwise performed.

7. Examples

A numbered list of specific examples of the technology described herein are provided below. A person of skill in the art will recognize that the scope of the technology is not limited to and/or by these specific examples.

Specific Example 1. A thermal reactor comprising:

catalytic sheet comprising:

- a conductive base comprising a first conductive plate, a second conductive plate, and a structured conductive plate between the first conductive plate and the second conductive plate, wherein the structured conductive plate is in contact with a first broad face of the first conductive plate and a first broad face of the second conductive plate;
- a dielectric coating disposed on a second broad face of the first conductive plate and on a second broad face of the second conductive plate; and
- an active material disposed on the first broad face of the first conductive plate, the first broad face of the second conductive plate, and the structured conductive plate;

a first electrode in electrical connection with the conductive base of the catalytic sheet at a first edge;

a second electrode in electrical connection with the conductive base of the catalytic sheet at a second edge opposing the first edge along a length of the catalytic sheet;

wherein the catalytic sheet is rolled such that, in cross section, the catalytic sheet forms a spiral around the first electrode with the second electrode located at an end of the spiral, wherein the dielectric coating electrically insulates adjacent turns of the conductive base within the spiral. In some variations, at least one of the first or second electrode can be a cylindrical electrode.

Specific Example 2. A thermal reactor comprising: The thermal reactor of Specific Example 1, wherein the dielectric coating comprises a glass-ceramic composite.

Specific Example 3. The thermal reactor of Specific Example 2, wherein the glass-ceramic composite comprises 50% by mass glass and 50% by mass ceramic.

Specific Example 4. The thermal reactor of any of Specific Examples 2-3, wherein a glass of the glass-ceramic composite comprises a coefficient of thermal expansion that differs by less than 10% from a coefficient of thermal expansion of a ceramic of the glass-ceramic composite.

Specific Example 5. The thermal reactor of any of Specific Examples 1-4, wherein the dielectric coating consists of a ceramic.

Specific Example 6. The thermal reactor of any of Specific Examples 1-5, further comprising an insulating housing, wherein the insulating housing surrounds the rolled catalytic sheet, the first electrode, and the second electrode.

Specific Example 7. The thermal reactor of any of Specific Examples 1-6, wherein the first conductive plate, the second conductive plate, and the structured conductive plate, each comprise iron-chromium-aluminium alloy.

Specific Example 8. The thermal reactor of any of Specific Examples 1-7, wherein the active material comprises catalytic material and sorbent.

Specific Example 9. The thermal reactor of any of Specific Examples 1-8, wherein the active material comprises at least one of: nickel, ruthenium, copper, iron, cobalt, zinc, palladium, platinum, rhodium, molybdenum, rhenium, gold, silver, or oxides thereof.

Specific Example 10. The thermal reactor of any of Specific Examples 1-9, wherein the second electrode is clamped to the conductive base of the catalytic sheet at the second edge to establish an electrical connection.

Specific Example 11. The thermal reactor of any of Specific Examples 1-10, wherein the second electrode is wrapped by the conductive base of the catalytic sheet at the second edge to establish an electrical connection.

Specific Example 12. The thermal reactor of any of Specific Examples 1-11, wherein the first electrode is welded to the conductive base of the catalytic sheet at the first edge.

Specific Example 13. The thermal reactor of any of Specific Examples 1-12, wherein the structured conductive plate comprises corrugated metal.

Specific Example 14. A method comprising:

applying a voltage across a first electrode and a second electrode of a thermal reactor, the thermal reactor comprising a catalytic sheet electrically connected to the first electrode at a first edge and to the second electrode at a second edge opposing the first edge along a length of the catalytic sheet, wherein the catalytic sheet is heated to a reaction temperature between 100° C. and 3000° C. by resistive heating, the catalytic sheet comprising:

a conductive base comprising a first conductive plate, a second conductive plate, and a structured conductive plate in electrical contact with the first conductive plate and the second conductive plate;

a dielectric coating disposed on a surface of the first conductive plate and on a surface of the second conductive plate opposing a surface of the first conductive plate and the second conductive plate in electrical contact with the structured conductive plate; and an active material disposed on the surface of the first conductive plate in electrical contact with the structured conductive plate, the surface of the second conductive plate in electrical contact with the structured conductive plate, and the structured conductive plate;

wherein the catalytic sheet is arranged such that, in cross section, the catalytic sheet forms a tortuous electrical path with the first electrode at a first end and the second electrode at a second end, wherein the dielectric coating provides insulation between adjacent layers of the conductive base; and introducing reactants into fluid channels defined by the structured conductive plate of the catalytic sheet, wherein, while at the reaction temperature, the reactants are converted to products by the active material through a catalytic reaction.

Specific Example 15. The method of Specific Example 14, wherein the reactants comprise at least one of: hydrogen, carbon dioxide, carbon monoxide, water, methane, ethane, propane, butane, ethylene, propylene, acetylene, oxygen, nitrogen, argon, and helium.

Specific Example 16. The method of any of Specific Examples 14-15, wherein the active material comprises at least one of: nickel, ruthenium, copper, iron, cobalt, zinc, palladium, platinum, rhodium, molybdenum, rhenium, gold, silver, or oxides thereof.

Specific Example 17. The method of any of Specific Examples 14-16, wherein the active material comprises sorbent material selected from the group consisting of: calcium oxide (CaO), calcium carbonate (CaCO3), dolomite, magnesium oxide (MgO), hydrotalcite, hydrotalcite-derived mixed oxides, lithium zirconate ($Li_2ZrO_3$), and lithium orthosilicate ($Li_4SiO_4$).

Specific Example 18. The method of any of Specific Example 14-17, wherein the catalytic reaction comprises at least one of: reverse-water gas shift reaction, steam methane reforming, dry methane reforming, methanation, ethylene stream cracking, nonoxidative coupling of methane.

Specific Example 19. The method of any of Specific Examples 14-18, wherein the dielectric coating comprises:

30-70% by mass a ceramic, comprising at least one of: alumina, zirconia, ceria, yttria, ytterbia, lutetia, silica, zirconia stabilized alumina, yttria stabilized zirconia, mica, or ceramic paper; and 30-70% by mass a glass, comprising at least one of: silicate glass, borosilicate glass, soda-lime glass, aluminosilicate glass, lead glass, germanium oxide glass, tellurite glass, phosphate glass, antimonate glass, arsenate glass, titanate glass, tantalate glass, fluoride glass, or aluminate glass.

Specific Example 20. The method of any of Specific Examples 14-19, wherein the first conductive plate, the second conductive plate, and the structured conductive plate, each comprise iron-chromium-aluminium alloy.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A thermal reactor comprising:

a catalytic sheet comprising:

a conductive base comprising a first conductive plate, a second conductive plate, and a structured conductive plate between the first conductive plate and the second conductive plate, wherein the structured conductive plate is in contact with a first broad face of the first conductive plate and a first broad face of the second conductive plate;

a dielectric coating disposed on a second broad face of the first conductive plate and on a second broad face of the second conductive plate; and an active material disposed on the first broad face of the first conductive plate, the first broad face of the second conductive plate, and the structured conductive plate;

a first electrode in electrical connection with the conductive base of the catalytic sheet at a first edge;

a second electrode in electrical connection with the conductive base of the catalytic sheet at a second edge opposing the first edge along a length of the catalytic sheet;

wherein the catalytic sheet is rolled such that, in cross section, the catalytic sheet forms a spiral around the first electrode with the second electrode located at an end of the spiral, wherein the dielectric coating electrically insulates adjacent turns of the conductive base within the spiral.

2. The thermal reactor of claim 1, wherein the dielectric coating comprises a glass-ceramic composite.

3. The thermal reactor of claim 2, wherein the glass-ceramic composite comprises about 50% by mass glass and about 50% by mass ceramic.

4. The thermal reactor of claim 2, wherein a glass of the glass-ceramic composite comprises a coefficient of thermal expansion that differs by less than 10% from a coefficient of thermal expansion of a ceramic of the glass-ceramic composite.

5. The thermal reactor of claim 1, wherein the dielectric coating consists of a ceramic.

6. The thermal reactor of claim 1, further comprising an insulating housing, wherein the insulating housing surrounds the rolled catalytic sheet, the first electrode, and the second electrode.

7. The thermal reactor of claim 1, wherein the first conductive plate, the second conductive plate, and the structured conductive plate, each comprise iron-chromium-aluminium alloy.

8. The thermal reactor of claim 1, wherein the active material comprises catalytic material and sorbent.

9. The thermal reactor of claim 1, wherein the active material comprises at least one of: nickel, ruthenium, copper, iron, cobalt, zinc, palladium, platinum, rhodium, molybdenum, rhenium, gold, silver, or oxides thereof.

10. The thermal reactor of claim 1, wherein the second electrode is clamped to the conductive base of the catalytic sheet at the second edge to establish an electrical connection.

11. The thermal reactor of claim 1, wherein the second electrode is wrapped by the conductive base of the catalytic sheet at the second edge to establish an electrical connection.

12. The thermal reactor of claim 1, wherein the first electrode is welded to the conductive base of the catalytic sheet at the first edge.

13. The thermal reactor of claim 1, wherein the structured conductive plate comprises corrugated metal.

* * * * *